United States Patent
Pratz et al.

(10) Patent No.: US 12,518,277 B2
(45) Date of Patent: Jan. 6, 2026

(54) SYSTEM AND METHOD FOR CONDUCTING TRANSACTIONS USING A MACHINE ACCOUNT ACTIVATED USING A MACHINE'S CREDENTIAL

(71) Applicant: Car IQ, Inc., Oakland, CA (US)

(72) Inventors: Sterling Pratz, San Francisco, CA (US); Orang Ryan Tabibian, Lafayette, CA (US); Khalid El-Awady, San Francisco, CA (US); George William Melvin, Oakland, CA (US)

(73) Assignee: Car IQ, Inc., Oakland, CA (US)

(*) Notice: Subject to any disclaimer, the term of this patent is extended or adjusted under 35 U.S.C. 154(b) by 0 days.

(21) Appl. No.: 17/665,629

(22) Filed: Feb. 7, 2022

(65) Prior Publication Data

US 2022/0374895 A1 Nov. 24, 2022

Related U.S. Application Data

(60) Provisional application No. 63/190,408, filed on May 19, 2021, provisional application No. 63/190,418, (Continued)

(51) Int. Cl.
*G06Q 20/40* (2012.01)
*G06N 20/00* (2019.01)

(52) U.S. Cl.
CPC ......... *G06Q 20/4014* (2013.01); *G06N 20/00* (2019.01)

(58) Field of Classification Search
None
See application file for complete search history.

(56) References Cited

U.S. PATENT DOCUMENTS

| 9,434,389 B2 | 9/2016 | Harsham et al. |
| 10,440,028 B1 | 10/2019 | Makmel et al. |

(Continued)

FOREIGN PATENT DOCUMENTS

| EP | 3336735 A1 | 6/2018 |
| WO | 2020037149 A1 | 2/2020 |

OTHER PUBLICATIONS

Kang, "Enabling localized peer-to-peer electricity trading among plug-in hybrid electric vehicles using consortium blockchains", In: IEEE Transactions on Industrial Informatics 13.6. 29, [Online] Retrieved from the internet:http: folk.uio.no yanzhang IEEETII2017Blockchain.pdf entire document, (May 29, 2017), 11 pgs.

(Continued)

*Primary Examiner* — Paul S Schwarzenberg
(74) *Attorney, Agent, or Firm* — Jubin Dana; Dana Legal Services

(57) ABSTRACT

A system and method are disclosed that generate a profile for a machine and continuously identify and validate the machine to allow a machine to be associated with a machine account for conducting transactions. The system and method use information or data provided by the machine for authentication. The data provided by the machine includes any combination of sensor data, historical data, activity data, location data, transaction data and any other data related to the machine and its actions. The machine sends or initiates requests for transactions. The requests are analyzed and allowed to be completed or the requests are declined.

8 Claims, 16 Drawing Sheets

Related U.S. Application Data filed on May 19, 2021, provisional application No. 63/190,422, filed on May 19, 2021.

(56) References Cited

U.S. PATENT DOCUMENTS

| | | | | |
|---|---|---|---|---|
| 10,921,787 | B1* | 2/2021 | Kursun | H04L 63/102 |
| 10,990,894 | B2* | 4/2021 | Shaashua | G06F 16/35 |
| 11,783,323 | B1* | 10/2023 | Winklevoss | G06Q 20/36 |
| 2008/0232595 | A1 | 9/2008 | Pietrowicz et al. | |
| 2014/0058805 | A1 | 2/2014 | Paesler et al. | |
| 2016/0221818 | A1 | 8/2016 | Gotz | |
| 2017/0046652 | A1 | 2/2017 | Haldenby et al. | |
| 2017/0195336 | A1 | 7/2017 | Ouellette | |
| 2017/0302663 | A1 | 10/2017 | Nainar et al. | |
| 2018/0012433 | A1 | 1/2018 | Ricci | |
| 2018/0204232 | A1* | 7/2018 | Chambers | G06Q 10/1093 |
| 2020/0058176 | A1 | 2/2020 | Pratz et al. | |
| 2020/0193743 | A1 | 6/2020 | Pratz et al. | |
| 2020/0193744 | A1 | 6/2020 | Pratz et al. | |
| 2020/0194031 | A1 | 6/2020 | Cella | |
| 2022/0092575 | A1* | 3/2022 | Zheng | G06Q 20/308 |
| 2022/0122164 | A1* | 4/2022 | Kudo | G06Q 30/0206 |
| 2022/0394033 | A1* | 12/2022 | Akkapeddi | G16Y 40/30 |

OTHER PUBLICATIONS

Oham, "A Blockchain Based Liability Attribution Framework for Autonomous Vehicles", In: arXiv preprint arXiv:1802.05050 [Online] Retrieved from the internet:https: arxiv.org pdf 1802.05050.pdf entire document, (Feb. 14, 2018), 13 pgs.

R. Copeland and N. Crespi, "Wallet-on-wheels—Using vehicle's identity for secure mobile money," 2013 17th. International Conference on Intelligence in Next Generation Networks (ICIN), Venice, Italy, 2013, pp. 102-109, doi: 10.1109/ICIN.2013.6670900.

* cited by examiner

SYSTEM AND METHOD FOR CONDUCTING TRANSACTIONS USING A MACHINE ACCOUNT ACTIVATED USING A MACHINE'S CREDENTIAL

CROSS REFERENCE TO RELATED APPLICATIONS

This application claims the benefit of U.S. Provisional Application Ser. No. 63/190,408 titled HARDWARE APPLIANCE CONTINUOUS AUTHENTICATION filed on May 19, 2021, U.S. Provisional Application Ser. No. 63/190,418 titled HARDWARE APPLIANCE CONTINUOUS AUTHENTICATION filed on May 19, 2021, and U.S. Provisional Application Ser. No. 63/190,422 titled HARDWARE APPLIANCE CONTINUOUS AUTHENTICATION filed on May 19, 2021, the entire disclosures of all are incorporated herein by reference.

FIELD OF THE INVENTION

This invention is in the field of machines engaged in commerce and, more specifically, related to generating machine credentials for activation of machine accounts.

BACKGROUND

Machines can be used for many purposes. In some instances, operators of machines often intend to conduct a transaction. The operators engage account information (typically belonging to an owner of the machine) for conducting a transaction related to the machine, which transaction may be for the benefit or needs of the machine. For example, users purchase fuel to run a machine. It may also be the case that the transaction is for the benefit of the owner or operator (e.g., use the car to buy the driver or occupant lunch at McDonalds drive-through). As machines become more autonomous and less dependent on an operator for continuous operation, there is a need to have accounts that are associated with the machine itself and not linked to or affiliated with the owner of the machine, especially when the machine has different operators. There is a need to ensure that machine-based transactions are authorized and intended by the machine. There is also a need to distinguish between different machines with absolute certainty. Further, while these machines include advanced networking capabilities, it can be difficult to authenticate such machines because, the machines are susceptible to hacking and fraudulent manipulation by malicious entities. Therefore, what is needed is system and method to allow activation of machine accounts and authentication of the machine with respect to accessing the machine account for the purpose of transacting.

SUMMARY

In accordance with various embodiments and aspects of the invention, system and methods are disclosed for the activation of machine accounts and authentication of the machine with respect to accessing the machine account for the purpose of any interaction or transaction with other devices or merchants. One advantage of the invention is authenticating a machine for various reasons, including transacting, accessing, tracking, etc. as disclosed herein. Another advantage is the ability to link or associated the machine account with other accounts (of users) to allow receiving and sending payment.

BRIEF DESCRIPTION OF THE DRAWINGS

In order to more fully understand the invention, reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

Figure 1:
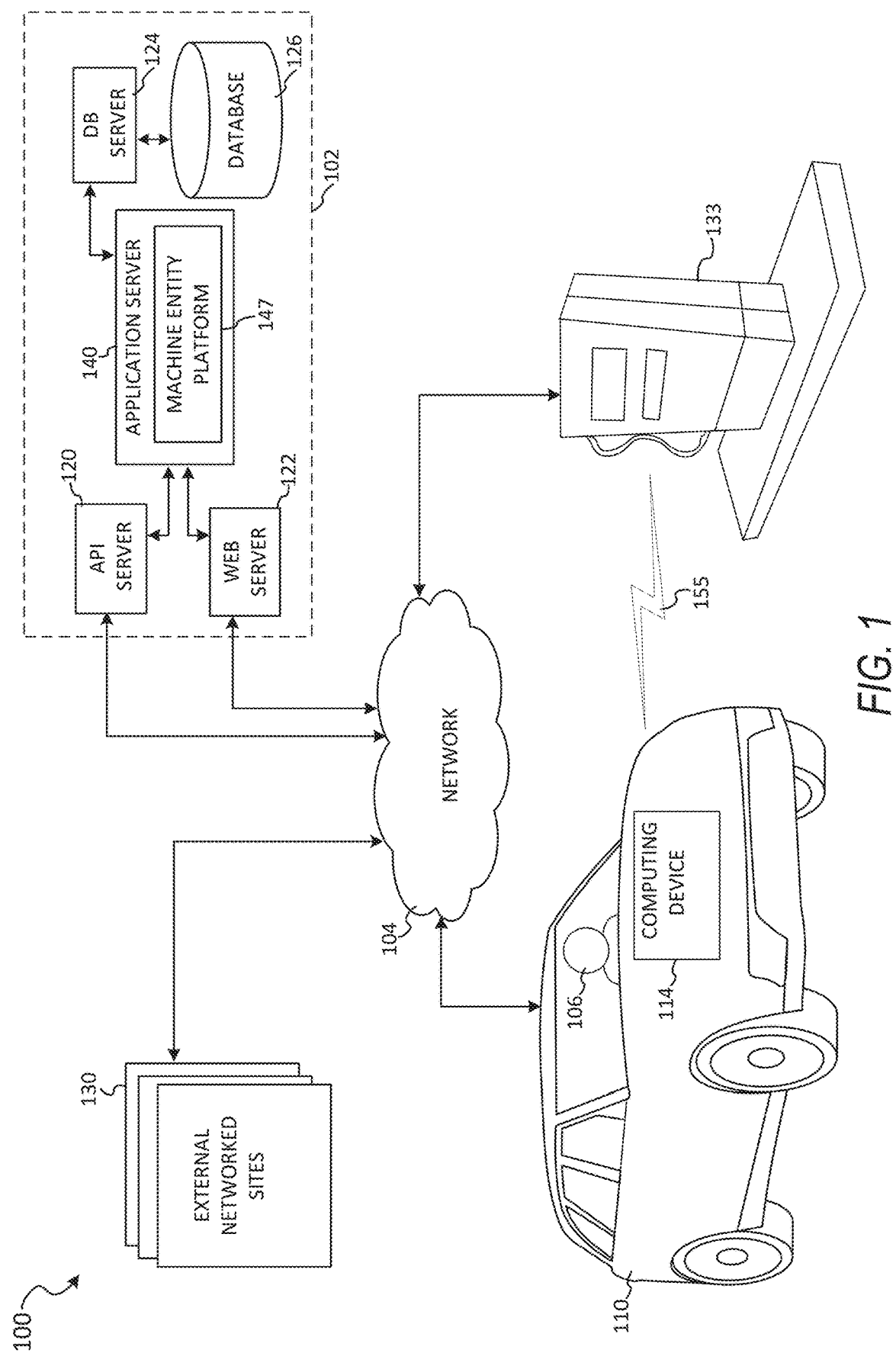
FIG. 1 shows example network architecture, in accordance with some aspects and embodiments of the invention.

In the following description, numerous specific details are set forth to provide a thorough understanding of various embodiments. However, one skilled in the relevant art will recognize that the embodiments described herein can be practiced without one or more specific details or with other methods, components, materials, etc. In other instances, well-known structures, materials, or steps are not shown or described in detail to avoid obscuring certain aspects.

The following describes various embodiments of the present technology that illustrate various interesting aspects. Generally, embodiments can use the described aspects in any combination. All statements herein reciting principles, aspects, and embodiments are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one," "an," "certain," "various," "embodiments" or similar language means that a particular aspect, feature, structure, or characteristic described in connection with the embodiment is included in at least one embodiment. Thus, appearances of the phrase "in accordance with one embodiment of the invention", and similar language throughout this specification may, but do not necessarily, all refer to the same embodiment or similar embodiments. Furthermore, aspects and embodiments described herein are merely by way of example, and should not be construed as limiting of the scope or spirit of the invention as appreciated by those of ordinary skill in the art. The invention is effectively made or used in any embodiment that includes any novel aspect described herein. Furthermore, to the extent that the terms "including", "includes", "having", "has", "with", or variants thereof are used in either the detailed description and the claims, such terms are intended to be inclusive in a similar manner to the term "comprising." In embodiments showing multiple similar elements, such as power source, even if using separate reference numerals, some such embodiments may work with a single element filling the role of the multiple similar elements.

The description that follows includes systems, methods, techniques, instruction sequences, and computing machine program products that embody non-limiting examples of embodiments of the disclosure. In the following description, for the purposes of explanation, numerous specific details are set forth to provide an understanding of various embodiments of the invention. It will be evident, however, to those skilled in the art, that the various embodiments of the invention may be practiced without these specific details. In general, well-known instruction instances, protocols, structures, and techniques are not necessarily shown in detail.

Referring to FIG. 1, in accordance with the various aspects and embodiments of the invention, a machine entity platform 147 is implemented to manage machine identification and authentication. For example, a machine is connected to a network. The machine may be any hardware device. In accordance with some embodiments, the machine includes processing capability, memory, various sensors, communication capability to allow network connections or connection with other machines. The machine's capability can be likewise implemented in any form factor, such as a printer, a washing machine, a refrigerator, a vehicle, etc. In accordance with some aspects and embodiments of the invention, the machine entity platform 147 generates a transaction account (or network account) for the machine (e.g., a network accessible banking account). The machine generates seed telematics data or profile information. The profile information is used to establish a profile for the machine, which can evolve and be updated over time. The profile, as it is updated, can continuously and dynamically track, identify, and authenticate the machine; the profile is a dynamic profile in accordance with some aspects of the invention. The machine interacts with one or more other networked and non-networked devices (e.g., a tollbooth, a gas station, a website, another nearby-machine) using the machine's profile (the continuously updating identifier), which acts as a trust-worthy mechanism for identifying and authenticating the machine with absolute certainty.

With reference to FIG. 1, a non-limiting example embodiment of a high-level client-server-based network architecture 100 is shown. In accordance with some embodiments, a system 102 is a network-based management platform that provides server-side processing via a network 104 (e.g., the Internet or wide area network (WAN)) to one or more machines or client devices. In one embodiment, the machine is a vehicle 110 that is connected to the system 102 through the network 104. The vehicle 110 interacts with a machine entity platform 147 hosted on an application server 140 to implement and manage service tasks. The system 102 includes a database 126 for storing information associated with the machine, such as the vehicle 110.

In accordance with some embodiments, a user (e.g., user 106) interacts with the vehicle 110, which then further interacts with the system 102 using a network 104. The vehicle 110 interacts with one or more devices (e.g., vehicle maintenance, fuel purchase, vehicle toll payment, streaming music payment) to initiate a transaction that can result in purchasing goods or services and/or payment for access or activity. For example, the vehicle 110 can interact with the fuel pump device 133 to request authorization to purchase and receive gasoline. This activity is associated with a transaction and results in a purchase. In accordance with some aspects of the invention, the terms "transact," "transaction," or "transacting" includes interactions with other devices or systems that are not financial in nature; the terms are not limited to financially related actions and will be evident from the context and content. For example, the machine can transact with a merchant's machine to exchange information of a non-financial nature.

The machine entity platform 147 authenticates the identity of the vehicle 110 and authorizes the fuel purchase. The purchase is then billed or paid for by the machine's transaction account. The transaction can then be further analyzed, as part of the authorization process, based on sensor data provided by the vehicle 110 to the machine entity platform 147 which is discussed in detail below. One non-limiting example of sensor data is fuel level sensor information. There are other types of sensor data that can be provided from the vehicle 110, which is discussed in detail below.

In accordance with some aspects and embodiments of the invention, the vehicle 110 interacts wirelessly 155 with the fuel pump device 133 to initiate the transaction request, the authentication, and/or the authorization. In accordance with some aspects of the invention, the vehicle 110 initiates the transaction request (for a transaction) directly to the machine entity platform 147, which then authenticates the vehicle 110, approves the transaction request, and signals the merchant to unlock the fuel pump device 133. In some aspects and embodiments, the vehicle 110 transacts directly with the merchant. In this way, the machine and merchant (provider) interact directly. This is analogous to an "offline" transaction, wherein the machine (vehicle 110) maintains all information necessary to autonomously transact with a merchant; the information includes, and it not limited to, account balance, authentication credentials, etc.

In accordance with some aspects and embodiments of the invention, the vehicle 110 arrives at the gas station and the machine entity platform 147 receives information from the vehicle 110, such as geolocation information. Based on historic information, profile data, or operation actions (operator turns off ignition—while still providing power to the systems of vehicle 110—at a specific location) the machine entity platform 147 determines that the vehicle 110 wants or intends to purchase gasoline. The machine entity platform 147 authorizes fuel purchase and sends the authorization to the merchant to activate the fuel pump device 133. The vehicle 110 can identify the fuel pump device desired and include that information as part of the information sent from the vehicle 110. Alternatively, and in accordance with some aspects of the invention, the vehicle 110 receives a notification signal from the machine entity platform 147 to select the desired fuel pump device for delivery of the gasoline. In this way, the purchase activity is streamlined because there is no need to initiate a transaction request from the vehicle 110 and/or through the merchant. In accordance with some aspects of the invention, once the machine entity platform 147 has authorized a transaction for purchasing fuel, a notification signal is sent to the vehicle 110 to allow the transaction to be cancelled, by the user 106 or the vehicle 110, if so desired.

The vehicle 110 includes computing device 114. The computing device 114 includes a processor to execute instructions stored in an integrated (non-transitory) memory, a communication transmitter for connecting to the network 104, and a plurality of sensors that measure different parameters of the vehicle 110, including hardware components. For example, the vehicle 110 includes sensors that measure different set of parameters. For instance, in accordance with some aspects and embodiments of the invention, an odometer can measure distance traveled, a fuel gauge measures the fuel level, a location sensor (e.g., GPS sensor) can determine current and past locations, and so on. The sensor data from the plurality of sensors is transmitted to the machine entity platform 147 via the computing device 114 interface with the vehicle 110 (e.g., a telematics interface, OEM interface, OBD interface, API network interface). For example, each of the cars can include a network interface (e.g., telematics device with an Internet connection or SIM-card based wireless connection) that periodically or continuously transmits or uploads sensor data over a secure channel to the machine entity platform 147.

Although a vehicle is discussed here as an example, it is appreciated that other hardware appliances that have a plurality of sensors can likewise be managed by the network architecture 100. For example, a smart refrigerator can include a plurality of sensors (e.g., freezer temperature, main compartment temperature, quantities and types of items stored), and upload the refrigerator sensor data to the machine entity platform 147 over a network interface (e.g., SIM-card based wireless card, wifi, physical network cord connections, such as a direct connection to a user's home router) for identification, authentication, and to perform one or more tasks for the refrigerator (e.g., order additional orange juice).

In some embodiments of the invention, the hardware device (e.g., a vehicle 110) communicates with the network 104 via a wired connection. In some embodiments of the invention, the hardware device (e.g., a vehicle 110) communicates with the network 104 via a wireless connection. In some embodiments of the invention, the hardware device (e.g., a vehicle 110) communicates with the network 104 via a combination of a wired and wireless connection. For example, one or more portions of the network 104 includes an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a Wireless Fidelity (WI-FI®) network, a Worldwide Interoperability for Microwave Access (WiMax) network, another type of network, or any suitable combination thereof.

Users (e.g., the user 106) include a person, a machine, or other means of interacting with the vehicle 110. In accordance with some aspects and embodiments of the invention, the user 106 is not part of the network architecture 100 and interacts with the network architecture 100 via the vehicle 110 or another means. For instance, the user 106 provides input (e.g., touch screen input or alphanumeric input) to the vehicle 110 and the input is communicated to the system 102 via the network 104. In this instance, the system 102, in response to receiving the input from the user 106, communicates information to the vehicle 110 via the network 104 to be presented to the user 106. In accordance with some embodiments, the information is presented on a display of the machine. In accordance with some embodiments, the information is presented via a speaker of the machine. In this way, the user 106 can interact with the system 102 using the machine, such as the vehicle 110.

The API server 120 and the web server 122 are coupled to, and provide programmatic and web interfaces respectively to, one or more application server 140. The application server 140 can host a machine entity platform 147, which can include one or more modules or applications, each of which can be embodied as hardware, software, firmware, or any combination thereof. The application server 140 is, in turn, shown to be coupled to a database server 124 that facilitates access to one or more information storage repositories, such as database 126 (e.g., relational database system, blockchain distributed ledger). Further, while the client-server-based network architecture 100 employs a client-server architecture, the present inventive subject matter is not limited to such an architecture, and can equally well find application in a distributed, or peer-to-peer, architecture system.

Figure 2:
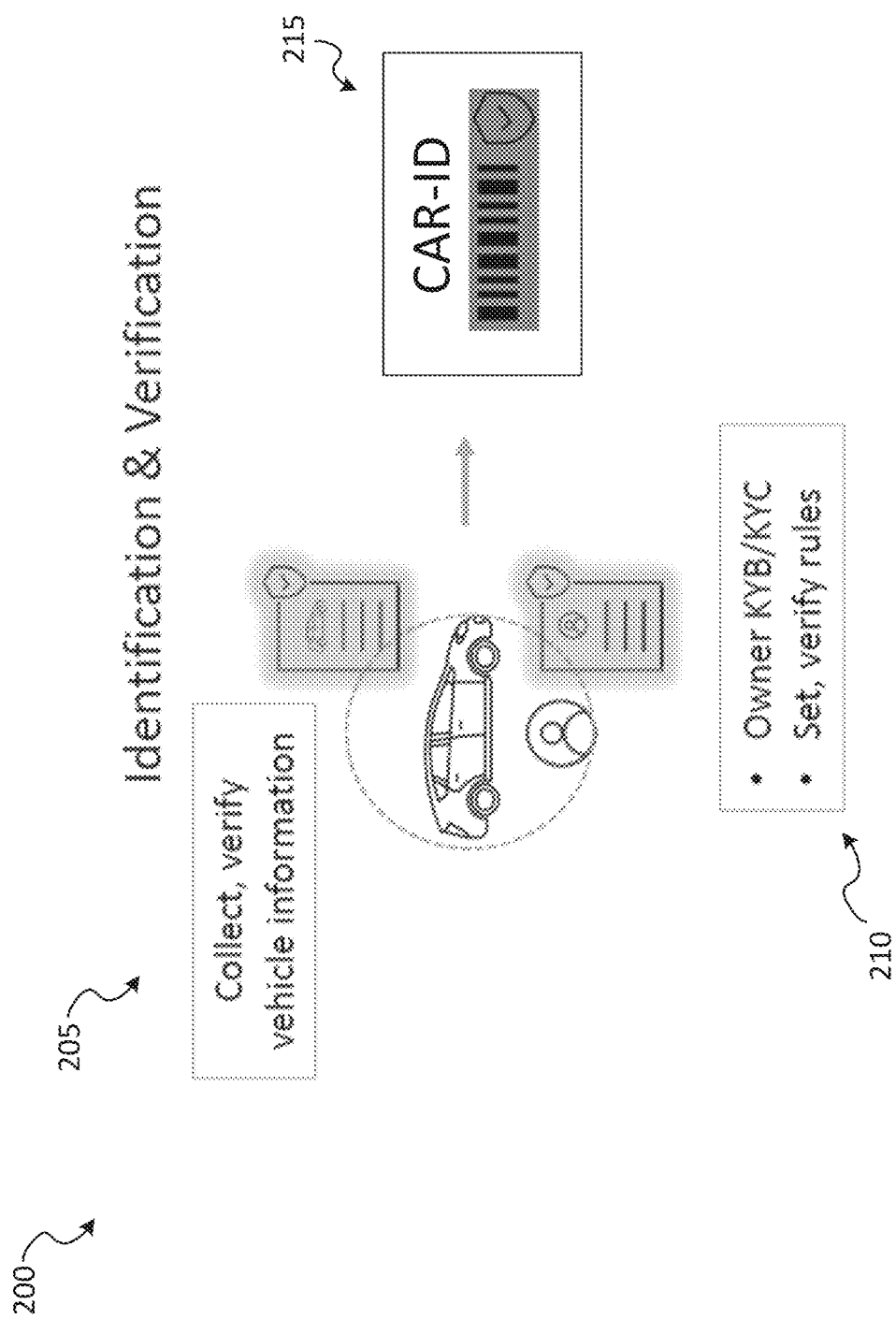
FIG. 2 shows a data flow architecture for network account establishment, in accordance with some aspects and embodiments of the invention.

Referring now to FIG. 2 along with references to FIG. 1, a data flow architecture 200 for network account establishment is shown according to some aspects and embodiments of the invention. At stage 205, data from the machine (e.g., vehicle) is collected and stored by the machine entity platform 147. In accordance with some aspects and embodiments of the invention, the data collected includes machine attribute data or profile data/information for the machine, including one or more of: the machine's unique information, such as a vehicle's Vehicle Identification Number (VIN), subcomponent serial numbers (e.g., ECU serial number), telematics, and vehicle sensor data.

In accordance with some aspects and embodiments, at stage 205, the data collected further includes contextual rule data for, in the example of a car, vehicle interactions, including (1) user and vehicle transaction eligibility limitations, and (2) constraint rules for transactions. The contextual data is a set of permissions and rules created by an account owner (e.g., fleet owner of a given group of vehicles) that define the scope for allowable (allowable-type) purchases and, thus, payment behavior for the vehicle. These rules make up a vehicle's Transaction Profile (TP). According to some aspects and example embodiments, the TP includes: a set of categories of merchants the vehicle may interact with (e.g., fuel, parking, tolls, repairs, or insurance, but not grocery, apparel, or footwear), limits on transactions (e.g., amount, velocity or rate of expenditure), geolocation restrictions if applicable, and further rules when explicit owner approval (e.g., fleet or business owner approval) is required as part of a transaction request for a transaction (e.g., above a certain amount). In accordance with some aspects of the invention, the vehicle's interactions with external devices are restricted in scope by account owner-defined transaction limits and eligibility constraints, e.g., geofencing. In accordance with some embodiments, credentials for the vehicle (and one or more end-operators of the vehicle) are stored in the cloud (e.g., system 102), tokenized, and/or communicated via state-of-the-art encryption standards over a network, such as network 104.

At stage 210, in accordance with some aspects and embodiments of the invention, the end-user information is collected and stored by the machine entity platform 147 to generate a user account on the system 102 and associate the user account with the machine's transaction account. In accordance with some aspects and embodiments of the invention, the end-user information is collected and stored by the machine entity platform 147 to generate a user account on the system 102 and one or more external end-user accounts of external networked sites (e.g., external payment accounts on a payment processing server). In accordance with some aspects of the invention, information (account owner, source of funds) is collected at the time of account creation, as step 210. This information is not initially identified/verified by the machine. Rather, a machine's unique identifiers are verified by the account owner, which account is associated with or for the machine, which machine's account is managed by the owner of the machine. The data collected at stage 210 includes account owner and funding account information such that the funds remain the exclusive property of individuals, commercial entities operating the vehicle, or the machine, which are all according to various aspects and embodiments of the invention. By pairing the vehicle to an account (e.g., the machine's transaction account or an external network account on a server of one or more of the external devices 130) and generating a continuous identifier for the vehicle to update the profile of the vehicle, the vehicle can transact complete transactions by itself. The vehicle itself can be identified (e.g., via a VIN). The vehicle is authenticated (e.g., via latest profile or state information model) and allowed to complete transactions using the continuously updated profile or machine identifier (e.g., latest state for the vehicle). The settlement of payment can occur later as an auxiliary process through the account (the transaction account of the machine) associated with the purchase or exchange. In accordance with some aspects and embodiments of the invention, the collected information (e.g., account owner and the source of funds) is identified and verified through fraud-proof mechanisms including Know-Your-Customer (KYC) procedures or Know-Your-Business (KYB) procedures, which is based on verification of machines. For example, Know-Your-Customer (KYC) procedures include, e.g., verifying the human user has a valid ID, real-world address, real-world accounts, etc.

At stage 215, the machine entity platform 147 generates, maintains, and updates a continuous identifier or profile for the vehicle. In accordance with some aspects and embodiments of the invention, the system 102 initiates requests for identification information from the machine. The information requested may include any information that can be provided by the machines and the scope of the invention is not limited thereby. Some portion of the identification information requested by the system 102 includes data to validate the machine before any transaction request is analyzed or approved. The identification information comes from the machine and is compared to historic identification data stored by the system 102. The system 102 controls/maintains the identification data, while a machine account may be managed and stored in a remote location with a third-party. Thus, the system 102 maintains the machine's profile, as explained in greater detail herein.

The profile is used to track, authenticate, manage, and enable network interactions by the vehicle. In some aspects and embodiments, the machine entity platform 147 generates the continuous identifier for the vehicle only after the vehicle transaction profile is confirmed by the account owner and the machine entity platform 147 has connected to receive streaming vehicle data to generate the continuous identifier; e.g., via updating a machine learning model for the vehicle and maintaining a vehicle state with a numerical likelihood value, as discussed in further detail below with reference to FIG. 4.

In accordance with various aspects and embodiment of the invention, the system 102 uses the machine learning model or artificial intelligence (AI) to generate or creates a unique and dynamic profile for each machine, as noted herein. For example, in the example of a vehicle, the model uses the previous historical data received from the vehicle and new or current data received from the vehicle. The model is trained on good historical identification data or data, which may be offline-data or stored data. In accordance with some aspects of the invention, historical identification data includes data or information associated with the machine that is stored and maintained. The data can be updated from time to time as new identification data/information is received. The term "historical identification data" is used interchangeably with "historical data" or "historical information" herein. The model uses new data received in real-time (current data). The system (the model) compares the new data to known stored historical data. Using the new data and historical data, the model is trained for detection of consistency of future actions of the machine. Additionally, using data comparisons (historic data compared to new data) the model understands possible future states (or actions) for the machine. Accordingly, the model can predict possible future transactions and associated transaction requests, which is based training of the model using historical data and current or new data.

In accordance with various aspects and embodiment of the invention, the model provides a score that reflects the probability that new data received from a vehicle is consistent (statistically) with the current profile, which includes or is derived from historical data, of that vehicle. The model uses the score to decide whether a vehicle (and data therefrom) is considered authenticated at any given time and, hence, deemed trustworthy to transact. If the new vehicle data is trusted, then the new data is incorporated into the profile to update the profile. If the new data is not trusted, then the model can alert the system 102; the system 102 can quarantine the vehicle from performing transactions (or transacting). The system 102 engages in a process to restore the vehicle's trust. In accordance with various aspects and embodiment of the invention, the process to restore the trust includes requesting new vehicle data or additional information, as discussed herein.

Figure 3A:
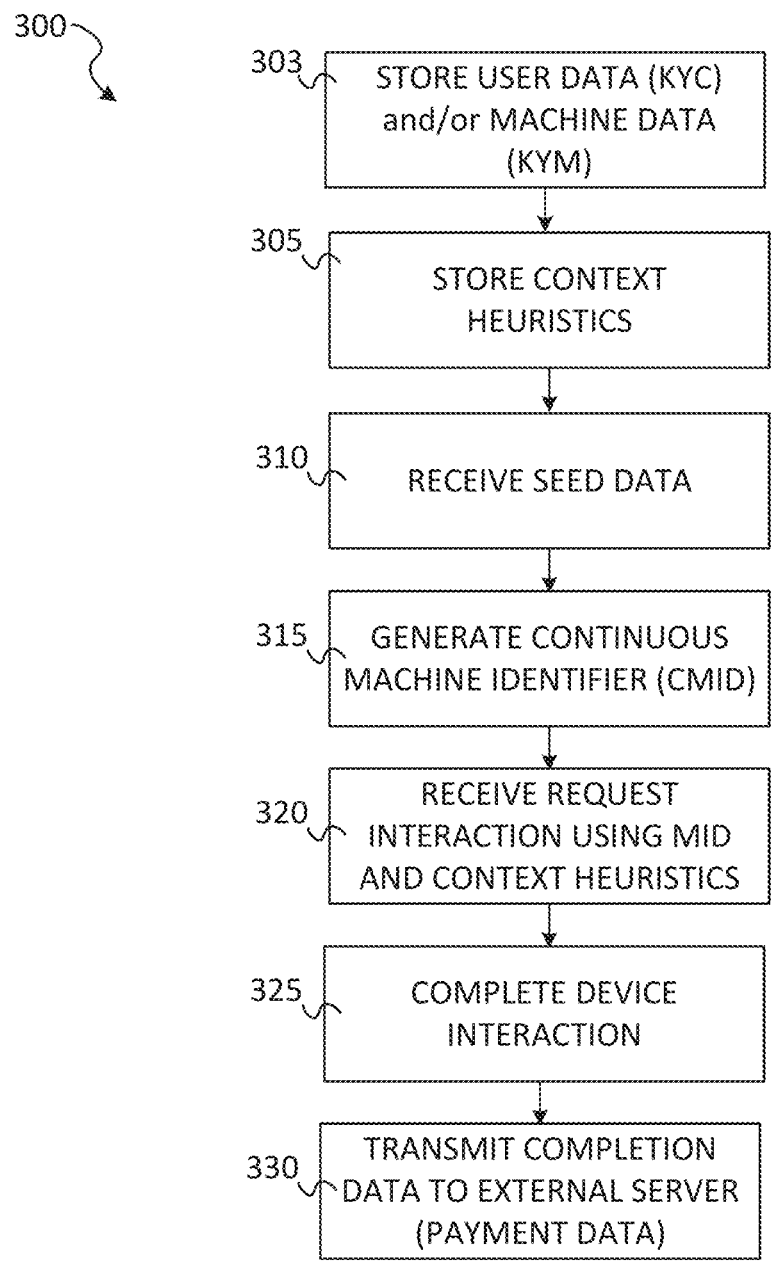
FIG. 3A shows a process for implementing machine interactions using a machine entity platform in accordance with some aspects and embodiments of the invention.

Referring now to FIG. 3A, a process 300 is shown for implementing network interactions using the machine entity platform 147 in accordance with various aspects and embodiments of the invention. At step 303, the machine entity platform 147 stores externally authenticated user data for a user, as discussed above (e.g., stage 210). In accordance with some embodiments, the machine entity platform 147 stores transaction account information associated for the machine intending to conduct transactions.

At step 305, the machine entity platform 147 stores context heuristics (e.g., transactional eligibility for different types of transactions, constraints, rules discussed as discussed above).

At step 310, the machine entity platform 147 receives seed data from the machine, for example the vehicle. The seed data can include data generated from a plurality of sensors of the machine. At step 315, the machine entity platform 147 generates a continuous machine identifier (CMID) using the seed data. For example, a machine learning model is trained on the seed data to generate a trained state model for the vehicle. A continuous identifier is generated to uniquely identify the vehicle (e.g., a VIN, a hash of the vehicle's information to generate a unique identifier for the vehicle on system 102). The machine sends the continuous identifies (information unique to the machine) to the system 102; the system 102 updates the CMID and maintains the information (including updating of the information). In accordance with some aspects and embodiments, the continuous identifier is used to identify the vehicle, whereas the authenticity of the continuous identifier is managed as a state in state space of the vehicle and is continuously updated, by the machine learning model, using periodically updated data from the vehicle sensors (e.g., fuel level, odometer value, geographic location). For example, the continuous identifier can uniquely identify the vehicle on the system 102, and the authentication or validity that the vehicle "is who it says it is", so to speak, is managed as a state that is continuously updated by the machine learning model using sensor data of the vehicle.

At step 320, the machine entity platform 147 receives a request from the vehicle for a network interaction using the continuous machine identifier to interact with one or more external devices (e.g., a fuel pump, a bridge toll, a road toll, a parking meter, a vehicle mechanic's garage).

At step 325, the machine entity platform 147 completes the requested device interaction. For example, the interaction request is transmitted to the machine entity platform 147 with recent telematics data from the vehicle. The machine entity platform 147 determines whether the vehicle's state is authenticated by determining whether the recently generated data from the vehicle is congruent with previous data from the vehicle (e.g., seed data) and approves the request if the likelihood of a positive state (e.g., greater than a numeral threshold of likelihood) is satisfied, as discussed in further detail below with reference to FIG. 4.

At step 330, the machine entity platform 147 transmits completion data to an external server (e.g., a third-party network site managing the funding account). For example, after completion of the interaction between the vehicle and the external device, the machine entity platform 147 transmits payment information to settle payment from the transaction account of the vehicle (machine) and/or the funding account of the user operating the vehicle (e.g., transmits payment information to a bank account server of the machine's bank or the user's bank, established during stage 210 in FIG. 2).

In accordance with some aspects and embodiments of the invention, once the machine entity platform 147 determines that recently generated data from the vehicle is consistent with previous data from the machine, then that recently generated data is added to the seed data for the machine, which can be used later new authentication. If the recently generated data is not added to the seed data, then the recently generated data is not allowed for future comparison; this provides a process to remedy bad data that is received at the system 102.

Figure 3B:
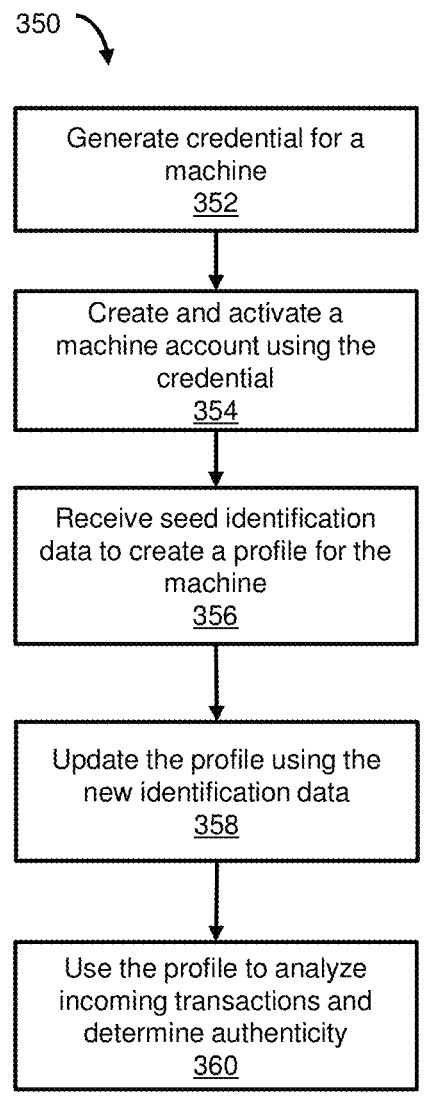
FIG. 3B shows a process for establishing a machine account and using the machine account for transactions, in accordance with some aspects and embodiments of the invention.

Referring now to FIG. 3B, a process 350 is shown for generating a credential for a machine that is used to generate a machine account. As used herein, a machine account is a financial-type or related transaction account for the machine, which machine account is based on the machine's credential. As discussed herein, seed identification data is used along with other changing or new machine related data (and credential for the machine) to generate a profile or machine profile. The profile is generated based on identification data/information for the machine and the machine's credential. In the example of a vehicle, the Vehicle Identification Number (VIN) may be the credential or used as part of generating the credential. Identification data/information, (from any sensor) may be collected and included in the profile data. Some examples of sensor data include: an odometer reading, sensors for geolocation information or current location, and sensors providing readings from an onboard computer monitoring the vehicle's performance. Additionally, sensors or devices within the vehicle, which are communicating with near-by devices, can also provide information. In accordance with various aspects and embodiments of the invention, the identification data/information is provided to the system 102.

At step 352, the system 102 generates the credential for the machine. As noted, the system 102 uses data that is specific or unique to the machine to generate the credential, for example the serial number of the machine. In accordance the various aspects of the invention, any unique information associated with the machine can be used for generation of the credential. At step 354, a machine account is created using the credential; the account can be activated at the time of creation or at a later point in time. The machine account is associated with the machine and used to handle and manage future transactions and activity that is initiated from or associated with the machine.

At step 356, the machine provides seed identification data/information to the system 102. The system 102 uses the seed identification data along with the credential for the machine to create a profile for the machine. The profile is store is the database 126. The profile can also be stored in the machine.

In accordance with some aspects and embodiments of the invention, the machine provides new identification data/information (e.g., this is data that is generated or changes as the machine is being operated or used) automatically, based on a specific time cycle or event or location or any desired triggering event. Any trigger can be used and any schedule can be designated for the machine to send updated or new identification information to the system 102. In accordance with some aspects and embodiments of the invention, the new identification information is, as noted herein, the current reading of any combination of sensors. In accordance with some aspects and embodiments of the invention, the new or updated identification data (e.g., in the case of a vehicle, vehicle related data) is communicated with a digital signature to confirm the authenticity of the data, for example in instances when the information originates from the vehicle on a non-continuous basis.

In accordance with some aspects and embodiments of the invention, the new identification information may be, as noted herein, associated with transactions or events related to the machine. In accordance with some aspects and embodiments of the invention, the system 102 initiates a request for updated new identification information (data) from the machine.

At step 358, the system 102 uses the new identification data to update the profile. The system 102 updates the profile and store the updated profile in the database 126. Additionally, the updated profile (or the current state) can be stored the machine. At step 360, the profile is used to analyze any incoming transaction requests for a transaction (or interaction) with an external device (or merchant). In accordance with some aspects and embodiments of the invention, the system 102 can access the profile information stored in the database 126 and compare it to the state information (profile) stored in the machine to determine the authenticity of the transaction request. Once confirmed that the request is authentic, the transaction request is approved and the transaction is allowed to be completed. The transaction can proceed to completion. Examples approved or allowed or qualified transaction include permissible goods and services enabled for the machine, which covers the merchants, merchant categories, or types of services allowed (e.g., gas, parking, tolls, repairs, etc.). In accordance with some aspects and embodiments of the invention, the system 102 includes transaction rules. For example, transaction dollar ($) amount limits that can vary by merchant category, frequency, or velocities (total number of transactions in a given period) of transactions, and total dollar ($) spend limits in a given time frame, which can be merchant specific, category specific, or independent of any merchant/category type.

In accordance with some aspects and embodiments of the invention, if the transaction request is declined, for any reason, then the declined transaction request is stored in the database 126. The system 102 may update the profile of the machine with the decline information. The system 102 may send a notice of the decline to the machine's owner or operator or authorized manager of the machine account. As noted herein, the term "qualified" is used to indicate an allowable transaction.

Figure 3C:
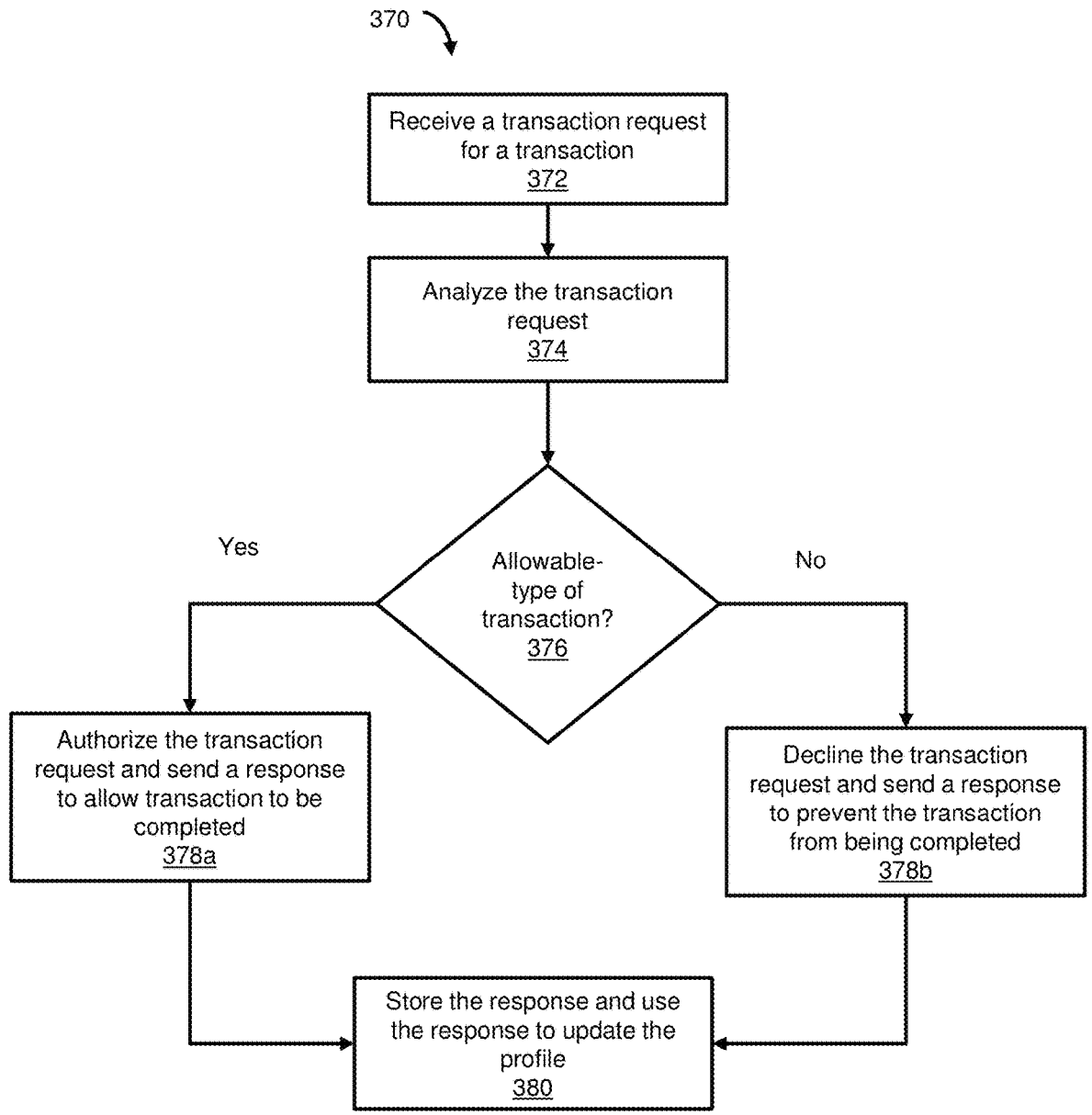
FIG. 3C shows a process for preventing fraudulent when using a machine account for transactions, in accordance with some aspects and embodiments of the invention.

Referring now to FIG. 3C, a process 370 is show for detection and prevention of unauthorized (including fraudulent) transaction when using a machine account of a machine. At step 372, a transaction request is received for a transaction involving a machine. The transaction request may initiate from the machine, the system 102, or a merchant wherein the machine is located. At step 374, the system 102 analyzes the transaction request. The system 102 uses the machine's profile and a set of transaction rules for the machine using the machine account. The system 102 determines if the transaction request is authentic. As step 376, the system 102 determines if the transaction is an allowable-type of transaction for the machine. If so, then at step 378a the system 102 indicated that the transaction is authorize because the transaction request and the transaction is the allowable-type of transaction. If not, then at step 378b, the system 102 declines the transaction request and the transaction because it is not the allowable-type of transaction. The system, at step 380, sends either a response to the transaction request to allow the transaction to be completed or sends a decline response to prevent the transaction from completing or going forward. The system 102 stores the appropriate response and updates the profile for the machine.

Figure 4:
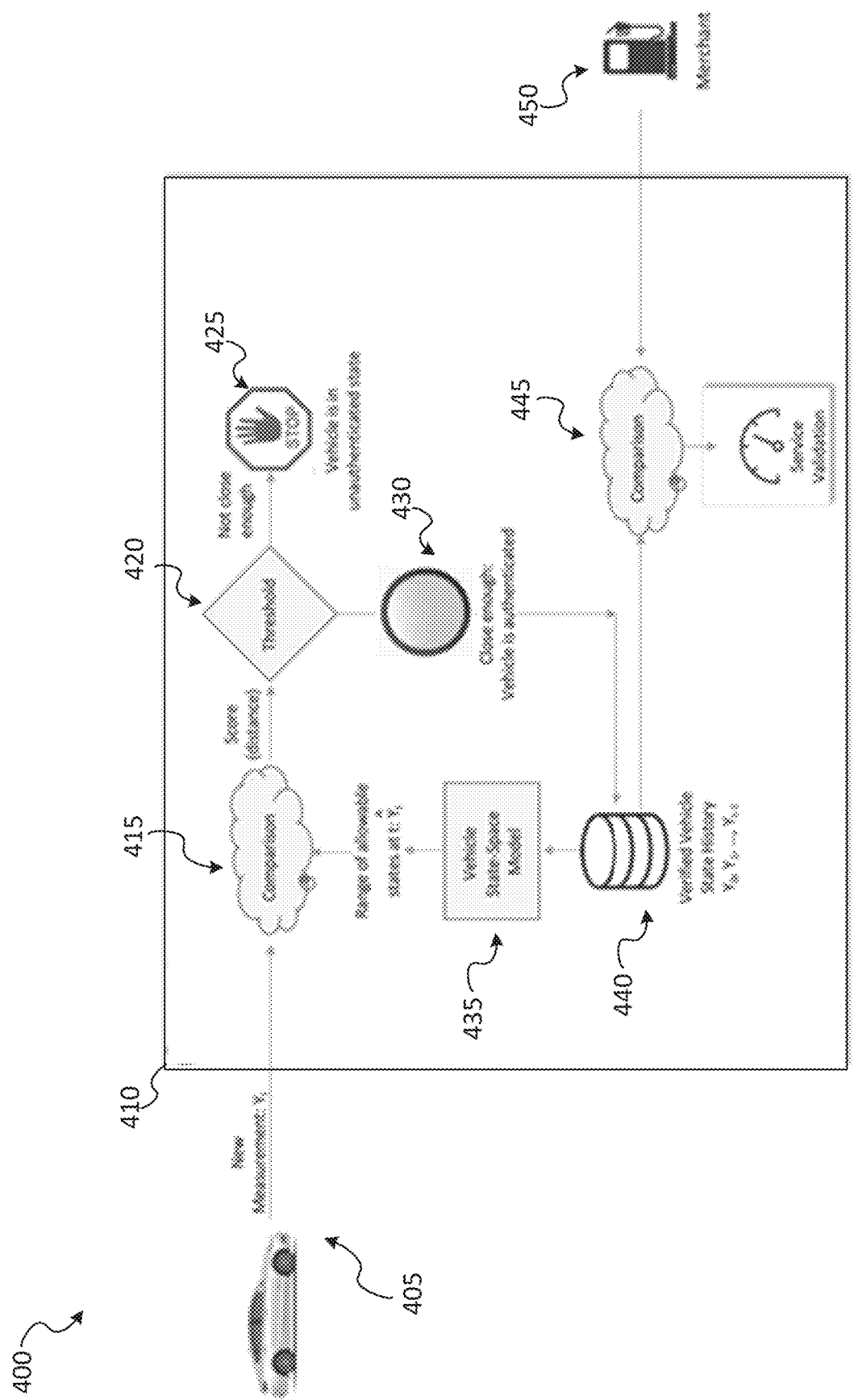
FIG. 4 shows network architecture for implementing machine interactions with external devices using the platform, in accordance with some aspects and embodiments of the invention.

Referring now to FIG. 4, a network architecture 400 for implementing machine interactions with external devices using the machine entity platform 147 is shown in accordance with various aspects and embodiments of the invention. A vehicle 405 (e.g., vehicle 110, FIG. 1) is requesting fuel from a networked fuel pump 450 using a machine entity platform 410 (e.g., the machine entity platform 147, FIG. 1). The machine entity platform 410 includes a trained machine learning model, such as an ensemble classifier (e.g., Random Forest, XGBoost) that is trained on seed data from the vehicle 405 to generate a trained vehicle state-space model 435 for the vehicle 405 as discussed above. In accordance with some aspects and embodiments of the invention, the vehicle 405 generates profile data (telematics data) periodically or in a streaming manner, which is added to the verified vehicle state history data 440. The machine learning model analyzes and determines if the profile data is valid. The request for a transaction is sent to the network and can be generated by a user of the vehicle 405 or automatically by vehicle 405. For example, the vehicle enters a gas station parking lot as determined by a location sensor of the vehicle 405. Another example would be when the operator of the vehicle 405 turns off the ignition while at a case station, which causes a fuel interaction request to be sent to the machine entity platform 410. Then a fuel interaction approval is sent from the machine entity platform 410 to the vehicle 405 for confirmation.

The machine entity platform 410 receives the request (or sends a notification) with new telematics data, which is then compared 415 to the vehicle state-space model 435 to generate a numerical score indicating a likelihood whether the new telematics data is congruent with the trained vehicle state-space model 435 of the vehicle. In accordance with some aspects and embodiments of the invention, the data provided by vehicle 405 as part of the request (or via periodic uploads) includes: the vehicle's VIN (e.g., as read from the vehicle manufacturer integrated ECU), the current odometer value, the fuel level, the distance travelled since a reference point in time (e.g., trip distance value, distance since the on-boarding event in which the seed data is provided), and multiple GPS points from a GPS sensor of the vehicle 405, recent tire pressure values.

In accordance with some aspects and embodiments of the invention, the machine learning model is trained on the uploaded or direct values from the vehicle 405 (e.g., fuel level, tire pressure, location, odometer value, and/or trip value). In accordance with some aspects and embodiments of the invention, the machine learning model is trained on features that are derived from the direct values. Examples of derived features include one or more of: odometer difference (e.g., from a previous value from the verified vehicle state history data 440), fuel level difference (e.g., from a previous value added to the verified vehicle state history data 440), the ratio of the odometer difference and the distance value since last upload, the ratio of the fuel level difference and the distance value since last upload, and other ratios or differences of values of uploaded data in accordance with various aspects and embodiments of the invention.

At step 420, if the numerical score is not equal or higher to a pre-configured threshold, then the vehicle state is updated to an unauthenticated state at step 425. In accordance with some aspects and embodiments of the invention, in the unauthenticated state the transaction request (for a transaction) is then denied and the vehicle 405 cannot proceed with the transaction. Further, upon the state being unauthenticated, the recent telematics data is not added to the verified vehicle state history data 440.

Alternatively, at step 420, if the numerical score is close enough or exceeds the threshold, then the state of the vehicle 405 is set to authenticated and the vehicle interaction with the external device is allowed to proceed. For example, the machine entity platform 147 transmits an approval message to the networked fuel pump 450, which then unlocks to allow fuel purchase by the vehicle 405. Further, upon the numerical score being close enough, the recent telematics data associated with the request is further added to the verified vehicle state history data 440, which is used to update and train the vehicle state-space model 435, which further adjusts the allowed range of states for future requests.

In accordance with some aspects and embodiments of the invention, after completion of the fueling service, further re-validation of the service is confirmed by additional sensor data from the vehicle 405 at step 445. For example, to ensure that the fuel was received by the vehicle 405 of the associated request (e.g., and not fraudulently by another vehicle that pulled up to the pump after the request was sent to the machine entity platform 410), the fuel sensor data of the vehicle 405 is checked to determine that it is within parameters of the requested transaction (e.g., that the fuel pump issued five gallons of fuel, and the fuel tank level of vehicle 405 has increased by five gallons).

In accordance with some aspects and embodiments of the invention, the request is pre-validated and approved when the vehicle 405 generates the request and is then re-validated after service, and only after service is the transaction considered complete and authentic. For instance, in some cases, if the post-service validation at step 445 fails (e.g., the fuel pump issued five gallons, but the fuel sensor of the vehicle 405 does not change), the vehicle operator is notified of the discrepancy and service validation fails so that the vehicle state is transitioned to the service failed state at step 425.

In the example of FIG. 4, vehicle state information is discussed as an example to approve network device interactions for simplicity and clarity. In accordance with some aspects and embodiments of the invention, context rules set for the vehicle 405 are also used and implemented to approve (or deny) each network device interaction (e.g., geofencing of the vehicle 405 within a certain area, payment amount cap or limit, frequency of payments). Although in the example discussed here, the state is evaluated and updated when the fuel pump request is generated, in accordance with some aspects and embodiments of the invention, the machine entity platform 410 continuously updates the state in a process that is concurrent and independent of the network interaction request. For example, the machine entity platform 410 may continuously update the vehicle's state every five minutes using new data from the vehicle 405, whether or not a request for interaction is received. In this approach, the machine entity platform 410 can receive a request and rapidly check the current pre-computed state of the vehicle 405 (e.g., platform does not need to compute the new state), checks the context rules set for the vehicle 405, pre-validate the request, and post validate the request (e.g., after service based on sensor data, which is post-transaction) automatically.

Figure 5:
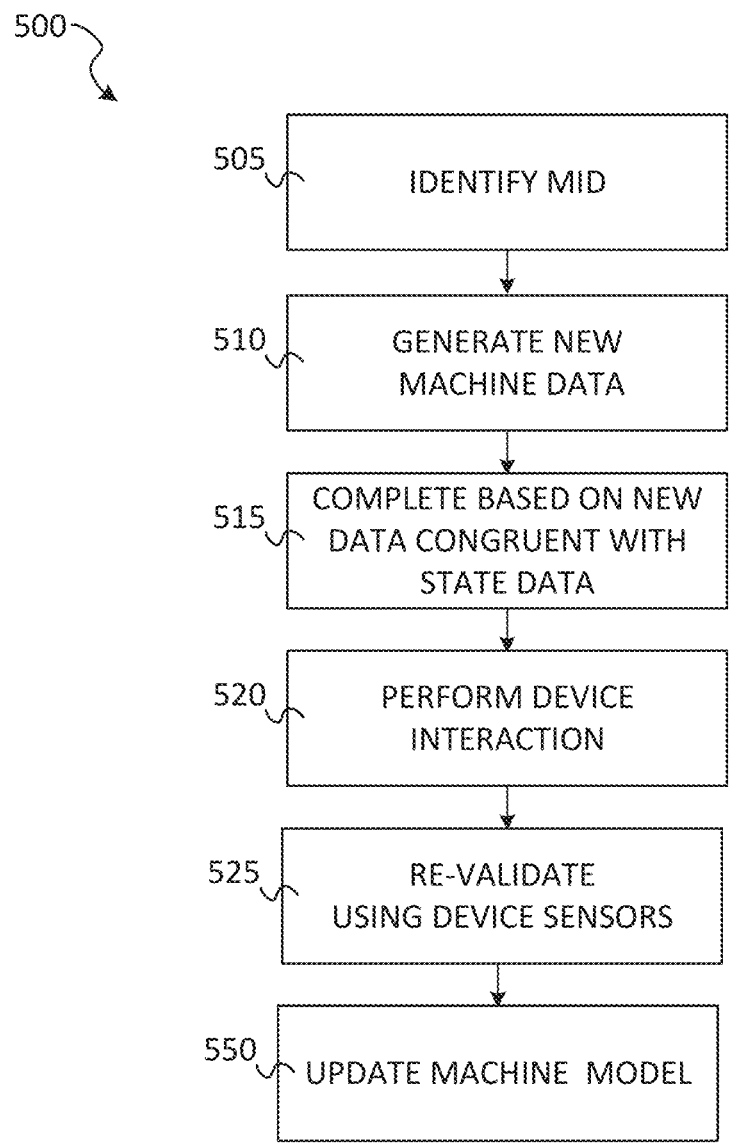
FIG. 5 shows a flow diagram of a method for implementing machine interactions, in accordance with some aspects and embodiments of the invention.

Referring now to FIG. 5, a process 500 is shown for implementing machine interactions in accordance with some aspects and embodiments of the invention. At step 505, the machine entity platform 147 identifies a machine identifier (MID) from the machine (e.g., the vehicle 405). For example, the machine entity platform 147 receives a request with an identifier that uniquely identifies the vehicle 110 on the system 102 (e.g., a VIN, a newly generated identifier for the vehicle generated in at stage 215, FIG. 2). At step 510, the machine entity platform 147 generates an updated continuous machine identifier (CMID0) using new machine data from the vehicle (e.g., updates the model in response to a request and/or updates the model concurrently in a continuous manner independent of requests being received).

At step 515, the machine entity platform 147 approves an interaction from the vehicle, which is based on recent vehicle data being congruent with the historical state data (e.g., the vehicle state is above the threshold of step 425).

Upon approval, at step 520 the device interaction is performed (e.g., parking meter is paid, gasoline is received, and/or other services and interactions).

At step 525, the machine entity platform 147 re-validates the interaction using new data from the vehicle 405. For example, the machine entity platform 147 determines that new data from the vehicle 405, which is after the interaction, is congruent with the requested action (e.g., determines that the fuel tank can receive five gallons and the new fuel sensor data determines that the fuel level has increased by five gallons). In accordance with some aspects and embodiments of the invention, as shown in FIG. 4, the data that is revalidated is first determined to be congruent with the existing data of the vehicle 405 using the machine learning model. In this way, the data integrity of the new sensor for re-validation is increased.

At step 550, after testing and re-validation to validate the network interaction, the machine entity platform 147 transmits interaction data to one or more external servers of a user of the vehicle 405. For example, after step 550, the machine entity platform 147 transmits a fuel payment amount to a payment server of the transaction account for the vehicle, the owner/entity owner of the vehicle, or an end-user operating the vehicle 405.

Referring now to FIGS. 6A-6F, a non-limiting example of a dashboard display user interface for a machine is shown in accordance with some aspects and embodiments of the invention. The dashboard display can be included as a display of a computing system integrated in the machine, such as the vehicle 405 or vehicle 110.

Figure 6A:
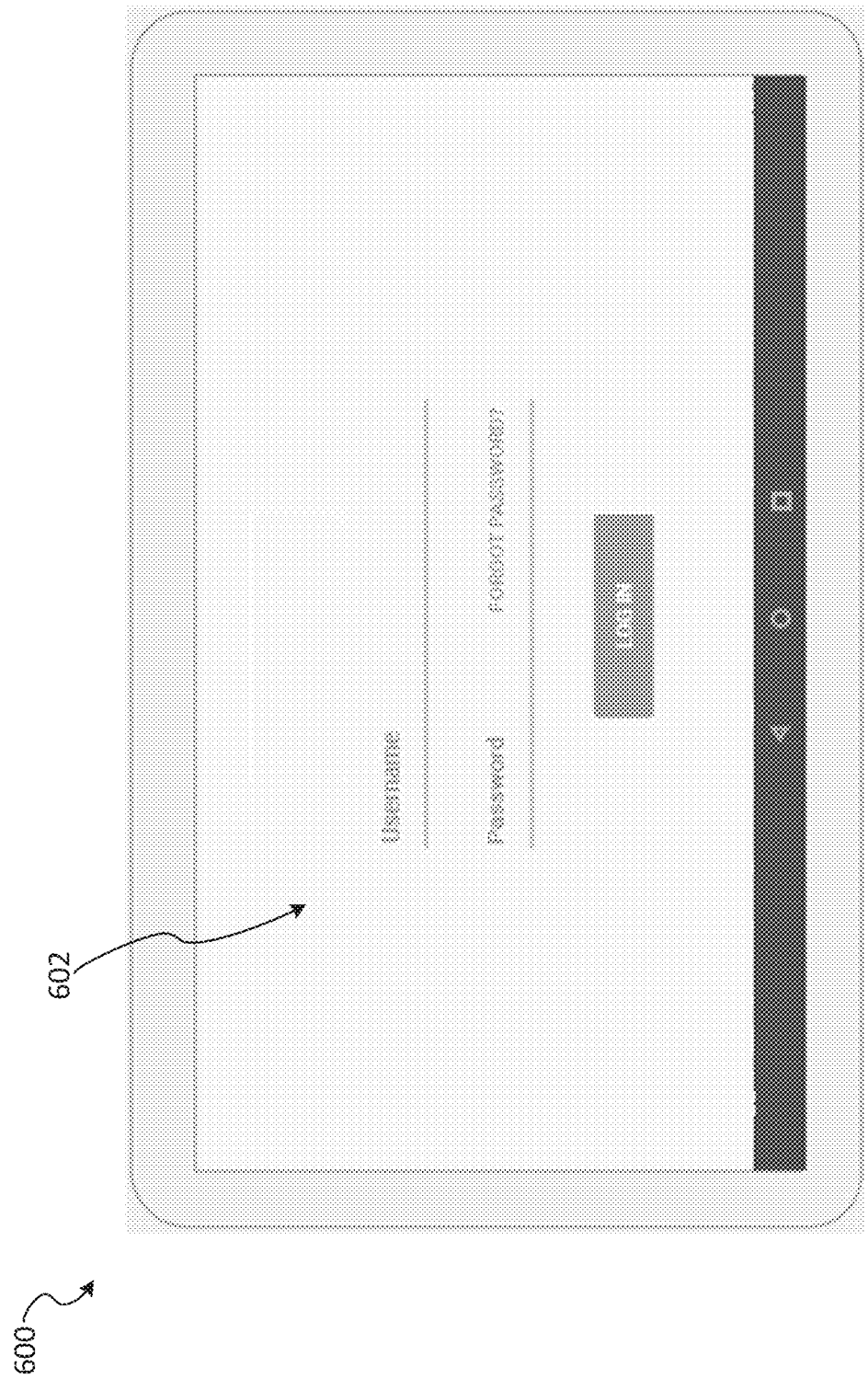
FIGS. 6A-6F show example user interfaces of a display device for implementing hardware appliance authentication, in accordance with some aspects and embodiments of the invention.

In FIG. 6A, a user interface 600 includes log-in elements 602 (e.g., username and password fields) to initiate an end-user session with the vehicle. While the example provided refers to a vehicle, the display may be part of any machine and the scope of the invention is not limited by the type of machine. In accordance with some aspects and embodiments of the invention, a user operating the vehicle can implement other mechanisms for authentication and initiation of an end-user session. For example, in accordance with some aspects and embodiments of the invention, the vehicle implements biometric authentication, in which a biometric sensor (e.g., fingerprint reader, eye scanner, face scanner) integrated in the vehicle identifies and authenticates a given vehicle user to enable initiation of a session for that user. Additionally, and in accordance with some aspects and embodiments of the invention, the user can initiate sessions using other mechanisms, such as inputting a code into the user interface that is wirelessly transmitted to a mobile device (e.g., text message a two-factor authentication code), scanning a scannable code (e.g., QR code) displayed on the user interface 600. Additionally, in accordance with some aspects and embodiments of the invention, the user of the vehicle has a wireless antenna module (e.g., mobile phone NFC, RFID tag) and the vehicle includes a wireless sensor to detect when the user is nearby and automatically initiate an active user session for the user.

Figure 6B:
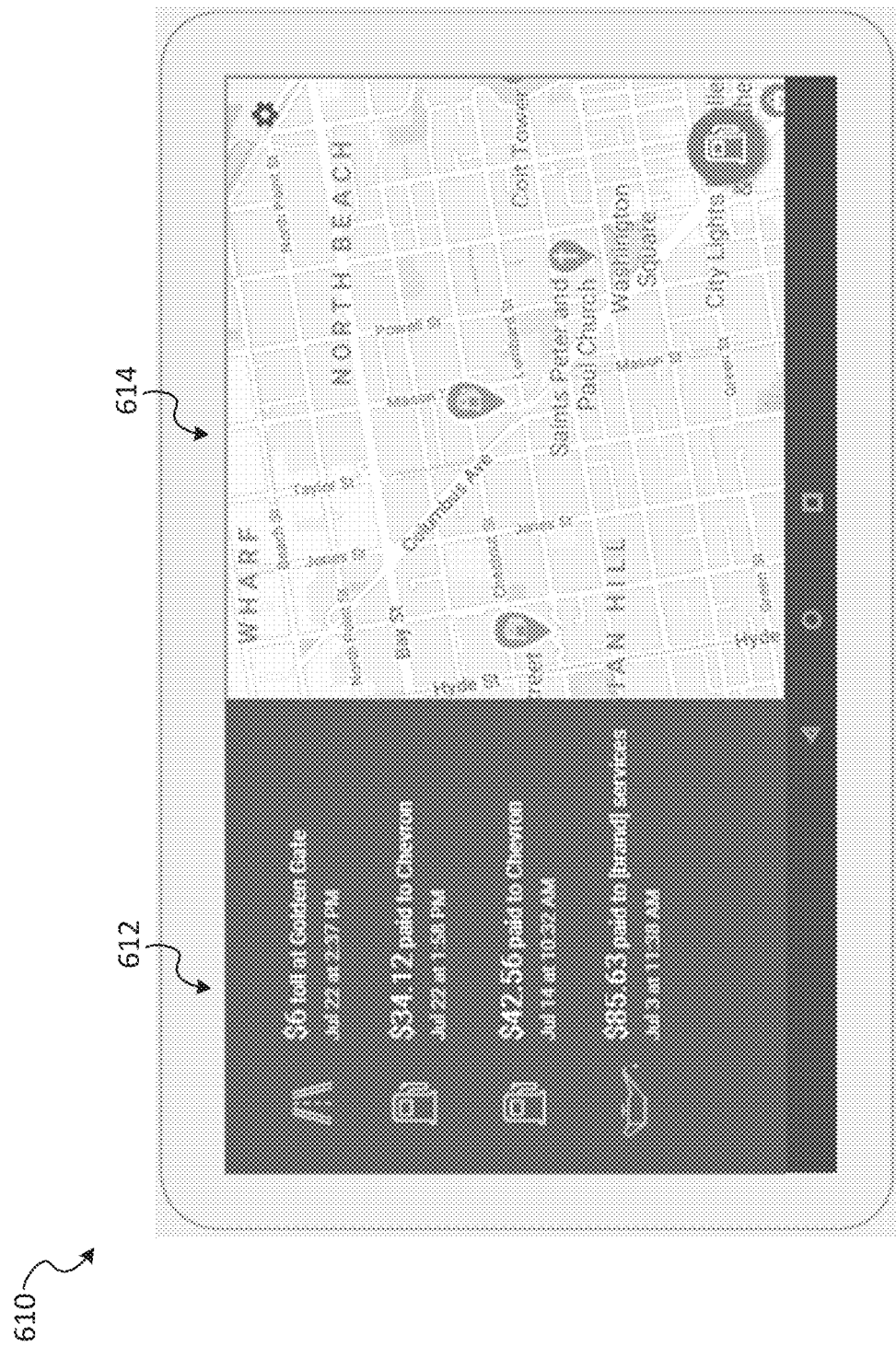

In FIG. 6B, a user interface 610 includes an interaction window 612 displaying vehicle interactions stored in the vehicle ledger (e.g., in database 126 of FIG. 1) by the machine entity platform 147. The user interface 610 further includes map window 614 for displaying vehicle location and external devices with which the vehicle can interact using the machine entity platform 147.

Figure 6C:
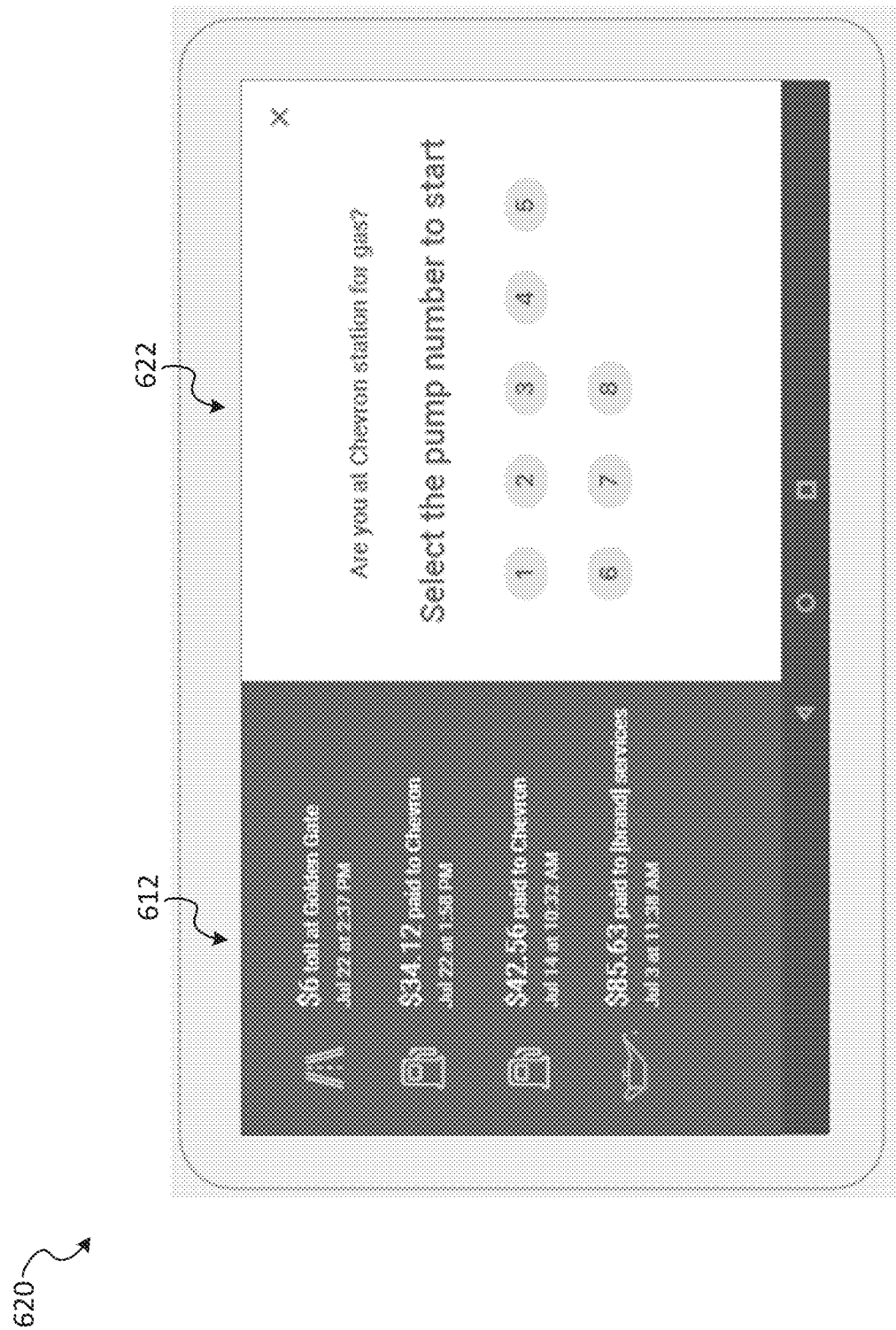

In FIG. 6C, a user interface 620 shows an interaction window 622 for interacting with some external devices or merchants. In the non-limiting example, the interaction window 622 presents information about the merchant and various external devices present at the merchant. The user can confirm information by selecting and activating one of the gas station pumps at the gas station identified. As event, there are various other actions that the user can take at the merchant and those options can be presented to the user. In accordance with some embodiments and aspects of the invention, the machine entity platform 147 initiates the fuel purchase process and sends confirmation information to the user interface 620.

Figure 6D:
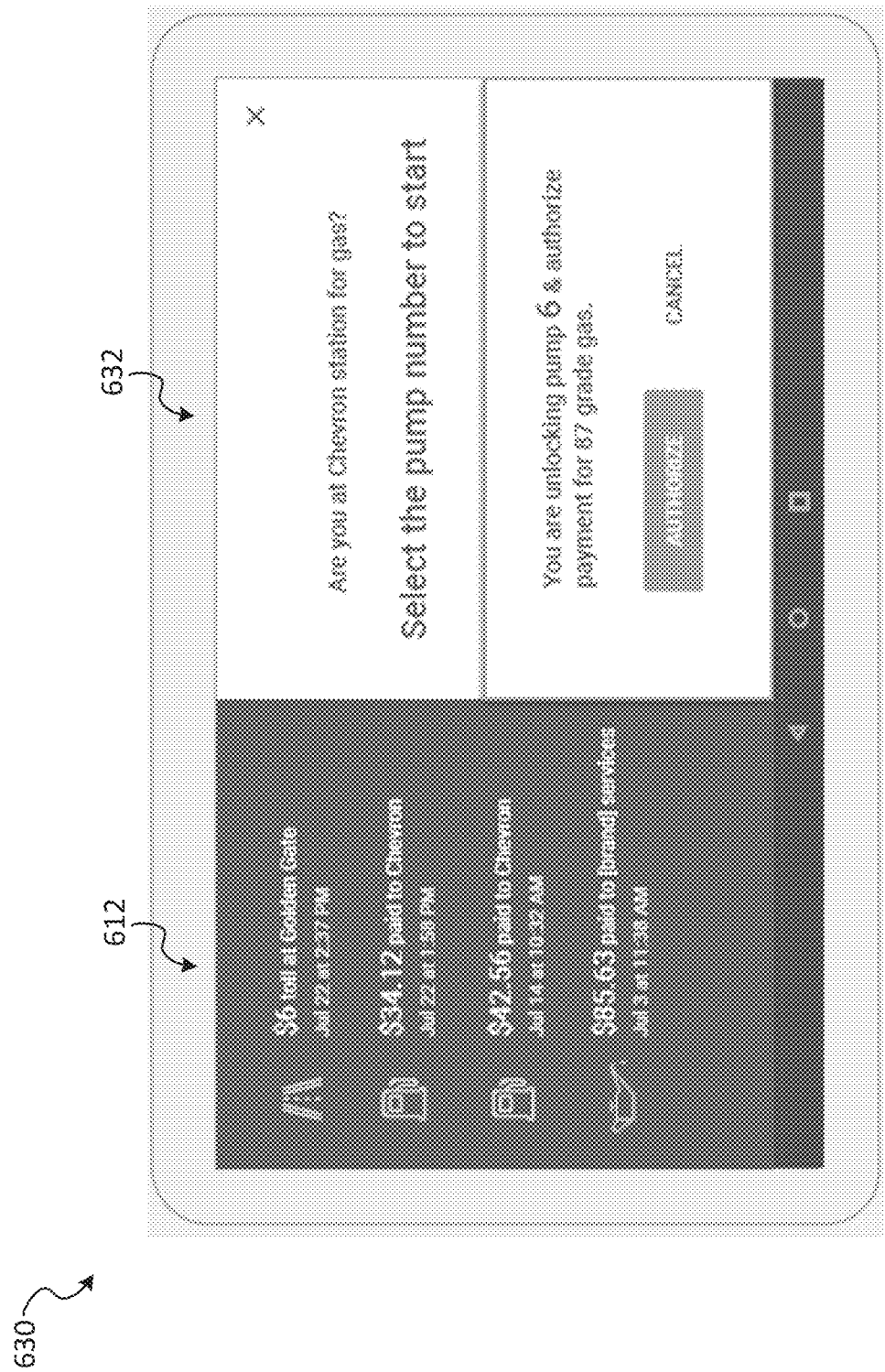

In FIG. 6D, a user interface 630 shows an initiation window 632 for authorizing an interaction.

Figure 6E:
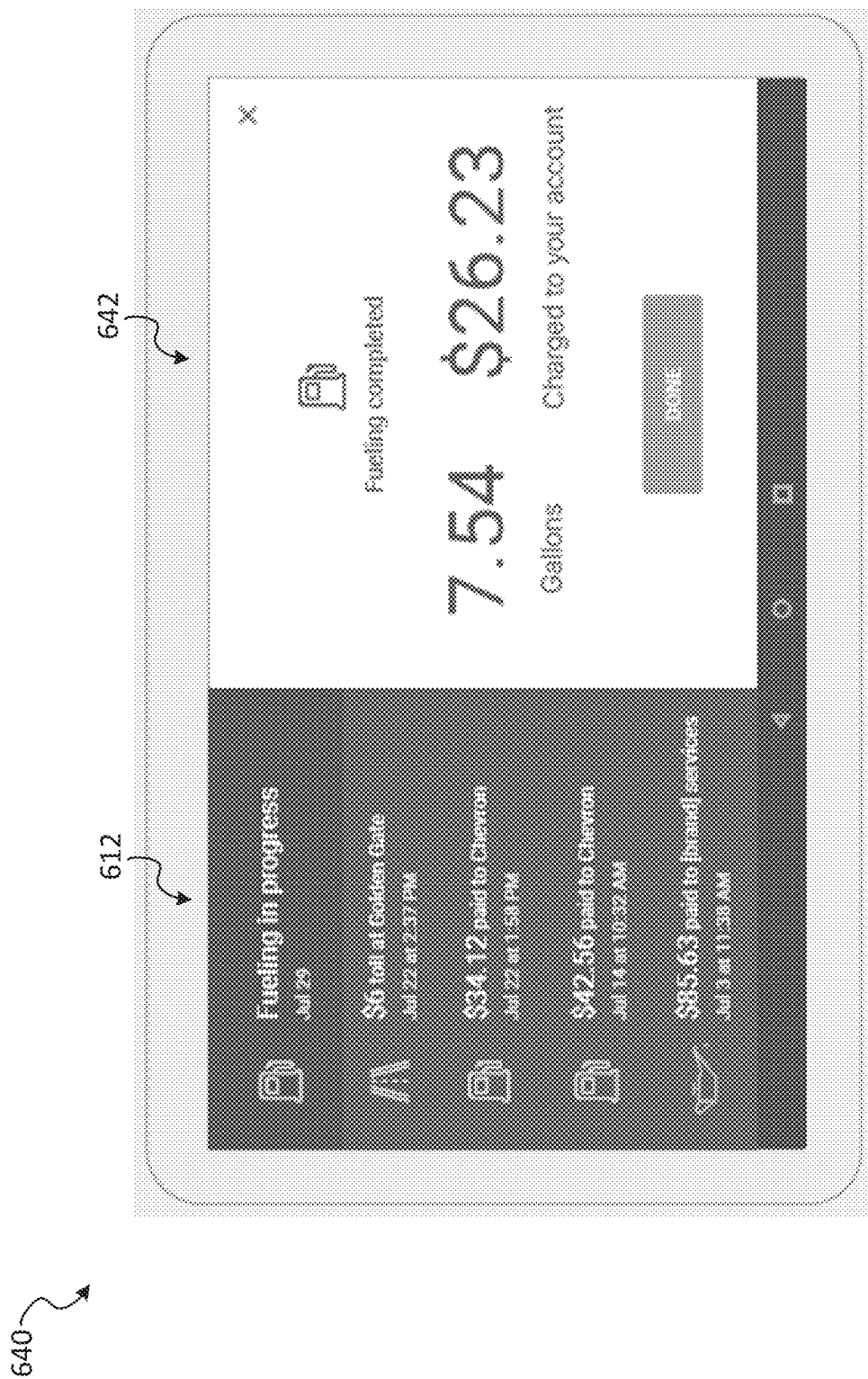

In FIG. 6E, a user interface 640 shows a completion screen 642 indicating performance of transaction with the external device (e.g., completion of the fuel fill-up). In accordance with some aspects and embodiments, the interaction window 612 is updated to display that an external device interaction is currently being performed or was just performed (e.g., "Fueling in Progress").

Figure 6F:
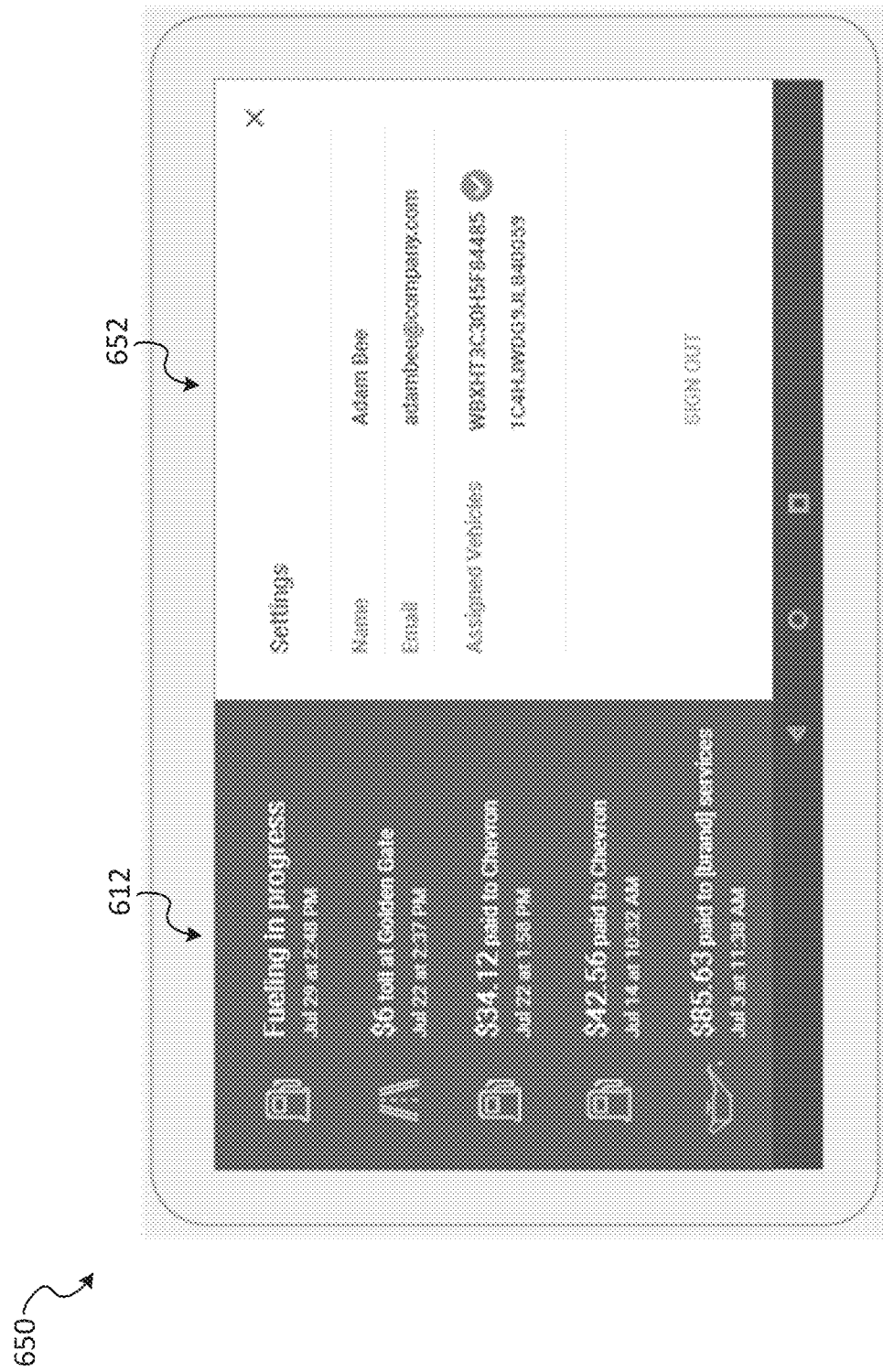

In FIG. 6F, a user interface 650 displays a settings screen 652 showing vehicle information (e.g., vehicles assigned for use by the end-user via the machine entity platform 147), and end-user information (e.g., end-username, preferences, and profile).

Figure 7:
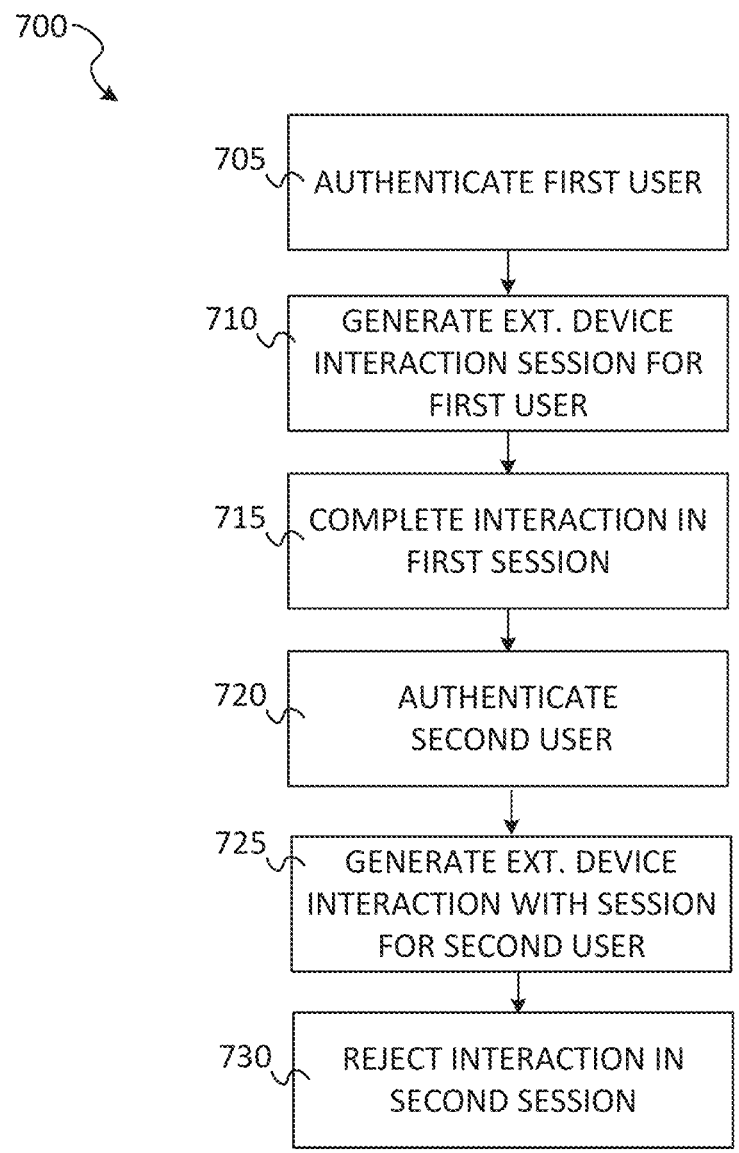
FIG. 7 shows a flow diagram of a method for multiple end-user interactions using a machine entity platform, in accordance with some aspects and embodiments of the invention.

Referring now to FIG. 7, a process 700 is shown for multiple end-user interactions using a machine entity platform 147 in accordance with some aspects and embodiments of the invention. Multiple end-users can interact and operate the vehicle and a vehicle ledger is maintained by the machine entity platform 147 as a durable continuous record of all interactions of the vehicle by the different users. Conventional vehicle reports record only large events (e.g., liens, title transfer, smog report, crashes) and generally rely on trusted entities (e.g., dealer, state or federal government, bank, police) to keep and/or update the record. It is impractical to maintain a detailed fraud-free vehicle interaction ledger (e.g., that records all maintenance services, fuel fill-ups, tolls, payments, etc.) report due to the requirement for trusted entities to maintain the record and the computational difficulty in ensuring that the record is accurate over a long period of time (e.g., the entire life of the vehicle). To this end, the machine entity platform 147 analyzes identification information (as well as transaction requests), allegedly being from the machine, to determine if the information is actually from the machine or if the information is fraudulent. The machine entity platform 147 implements any combination of the continuous machine identifier, context rules, and re-validation of services using the state model to create an accurate and detailed vehicle ledger that records all interactions by the vehicle, for all operators of the vehicles. The method 700 is an example of multiple users implementing machine interactions, which are managed by the machine entity platform 147 using a computing system integrated in the machine, such as the current example being a vehicle.

At step 705, the machine entity platform 147 authenticates a first user. For example, a first end-user operating the vehicle inputs their login information into a vehicle computing system using log-in elements 602 of the user interface 600 (e.g., displayed on a touchscreen that is integrated into the dashboard of vehicle or any machine's interactive display or touchscreen).

At step 710, the machine entity platform 147 generates an external device interaction session for the first user. For example, the machine entity platform 147 receives the first user's authentication information and activates a first network active session between the vehicle 110 and the machine entity platform 147, in which the interactions completed during the first session are associated in the vehicle ledger with the first user's profile or login credentials. Payments for the interactions are settled using an external account configured by the first user. In accordance with some aspects of the invention, the external account is directly used and linked to the interactions. In accordance with some aspects of the invention, the external account is linked to the vehicle's transaction account, which is used for the interactions, and then settles between the user's account and the machine's transaction account.

At step 715, machine entity platform 147 completes an interaction using the continuous machine identifier for the vehicle. For example, the vehicle 110 parks at a fueling station and the first user requests fuel from a fuel pump and the machine entity platform 147 completes the request for the user, revalidates the interaction and records the interaction in the vehicle ledger.

At step 720, the machine entity platform 147 authenticates a second user. For example, the machine entity platform 147 receives the second user's authentication information (e.g., of a different user that is operating the vehicle at a later time after the first user) and activates a second network session between the vehicle 110 and the machine entity platform 147, for which the interactions completed during the second session are associated in the vehicle ledger with the second user's account, and in which payments for the interactions are settled using an external account configured by the second user. In accordance with some aspects of the invention, the external account is directly used and linked to the interactions. In accordance with some aspects of the invention, the external account is linked to the vehicle's transaction account, which is used for the interactions, and then settles between the user's account and the machine's transaction account.

At step 725, machine entity platform 147 generates an interaction with an external device in the second user session. For example, the second user parks at a gas station to re-fuel the vehicle 110 and requests fuel from a fuel pump using the user interface in a dashboard of the vehicle. This second request for fuel is analyzed in light of most recent fuel purchase to determine if the transaction or interaction should be allowed.

At step 730, the machine entity platform 147 rejects the interaction because of the rules and historic data for the vehicle. For example, the machine entity platform 147 can determine that the vehicle 110 is in an un-authenticated state, that the second user has inadequate funds in the external account, or the transaction request (the interaction) violates context rules stored for the vehicle (e.g., the vehicle is outside a geofence, the service requested is not permitted by the end-user category of the second user, insufficient mileage has been driven to require purchase of more fuel etc.). After the rejection, the machine entity platform 147 then records the request, un-authenticated state, and rejection data in the vehicle ledger for the vehicle (e.g., in database 126). Alternatively, if the vehicle is in an authenticated state and the context rules are satisfied for the interaction (transaction), then the request is pre-validated, post-validated, and the completed interaction is recorded in the vehicle ledger.

Figure 8:
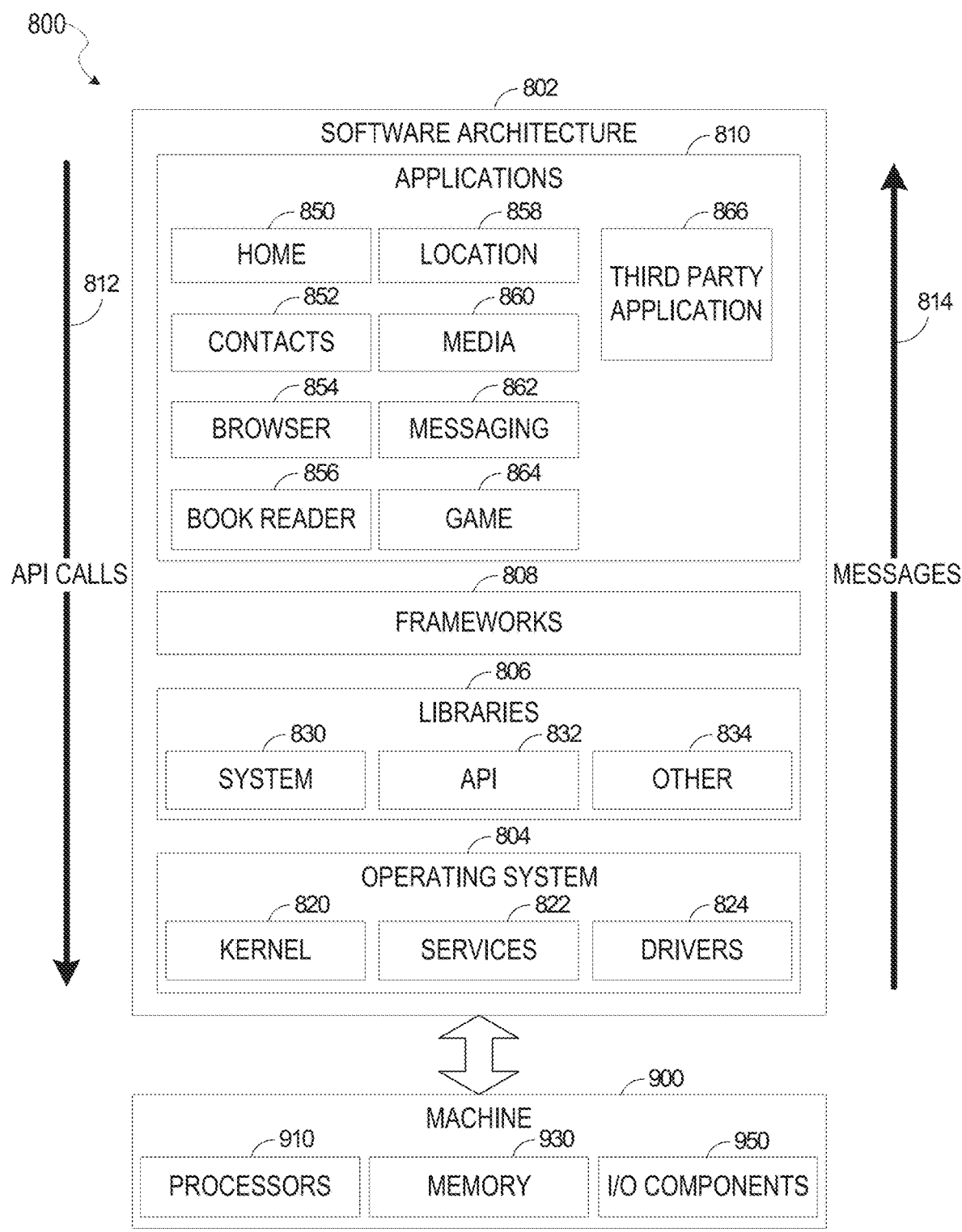
FIG. 8 is a block diagram illustrating a representative software architecture, which may be used in conjunction with various hardware architectures herein described.

Referring now to FIG. 8, a block diagram 800 illustrating an example software architecture 802, which may be used in conjunction with various hardware architectures herein described in shown in accordance with various aspects of the invention. FIG. 8 shows a non-limiting example of a software architecture, and it will be appreciated that many other architectures may be implemented to facilitate the functionality described herein. The software architecture 802 may execute on hardware such as a machine 900 of FIG. 9 that includes, among other things, processors 910, memory 930, and I/O components 950, and other components discussed below in further detail.

In the example architecture of FIG. 8, the software architecture 802 may be conceptualized as a stack of layers where each layer provides particular functionality. For example, the software architecture 802 may include layers such as an operating system 804, libraries 806, frameworks/middleware 808, applications 810, and a presentation layer. The applications 810 and/or other components within the layers may invoke API calls 812 through the software stack and receive a response in the form of messages 814. The layers illustrated are representative in nature and not all software architectures have all layers. For example, some mobile or special-purpose operating systems may not provide a frameworks/middleware 808, while others may provide such a layer. Other software architectures may include additional or different layers.

The operating system 804 may manage hardware resources and provide common services. The operating system 804 may include, for example, a kernel 820, services 822, and drivers 824. The kernel 820 may act as an abstraction layer between the hardware and the other software layers. For example, the kernel 820 may be responsible for memory management, processor management (e.g., scheduling), component management, networking, security settings, and so on. The services 822 may provide other common services for the other software layers. The drivers 824 are responsible for controlling or interfacing with the underlying hardware. For instance, the drivers 824 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 806 provide a common infrastructure that is used by the applications 810 and/or other components and/or layers. The libraries 806 provide functionality that allows other software components to perform tasks in an easier fashion than by interfacing directly with the underlying operating system 804 functionality (e.g., kernel 820, services 822, and/or drivers 824). The libraries 806 may include system libraries 830 (e.g., C standard library) that may provide functions such as memory allocation functions, string manipulation functions, mathematical functions, and the like. In addition, the libraries 806 may include API libraries 832 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 806 may also include a wide variety of other libraries 834 to provide many other APIs to the applications 810 and other software components/modules.

The frameworks/middleware 808 provide a higher-level common infrastructure that may be used by the applications and/or other software components/modules. For example, the frameworks/middleware 808 may provide various graphic user interface (GUI) functions, high-level resource management, high-level location services, and so forth. The frameworks/middleware 808 may provide a broad spectrum of other APIs that may be utilized by the applications and/or other software components/modules, some of which may be specific to a particular operating system 804 or platform.

The applications 810 include built-in applications and/or third-party applications 866. Examples of representative built-in applications may include, but are not limited to, a home application 850, a contacts application 852, a browser application 854, a book reader application 856, a location application 858, a media application 860, a messaging application 862, and/or a game application 862. The third-party applications 866 may include an application developed using the ANDROID™ or IOS™ software development kit (SDK) by an entity other than the vendor of the particular platform, and may be mobile software running on a mobile operating system such as IOS™, ANDROID™ WINDOWS® Phone, or other mobile operating systems. The third-party applications 840 may invoke the API calls 812 provided by the mobile operating system (such as the operating system 804) to facilitate functionality described herein.

The applications 810 may use built-in operating system functions (e.g., kernel 820, services 822, and/or drivers 824), libraries 806, and frameworks/middleware 808 to create user interfaces to interact with users of the system. Alternatively, or additionally, in some systems, interactions with a user may occur through a presentation layer, such as the presentation layer (e.g., graphical user interface class). In these systems, the application/component "logic" can be separated from the aspects of the application/component that interact with a user.

Figure 9:
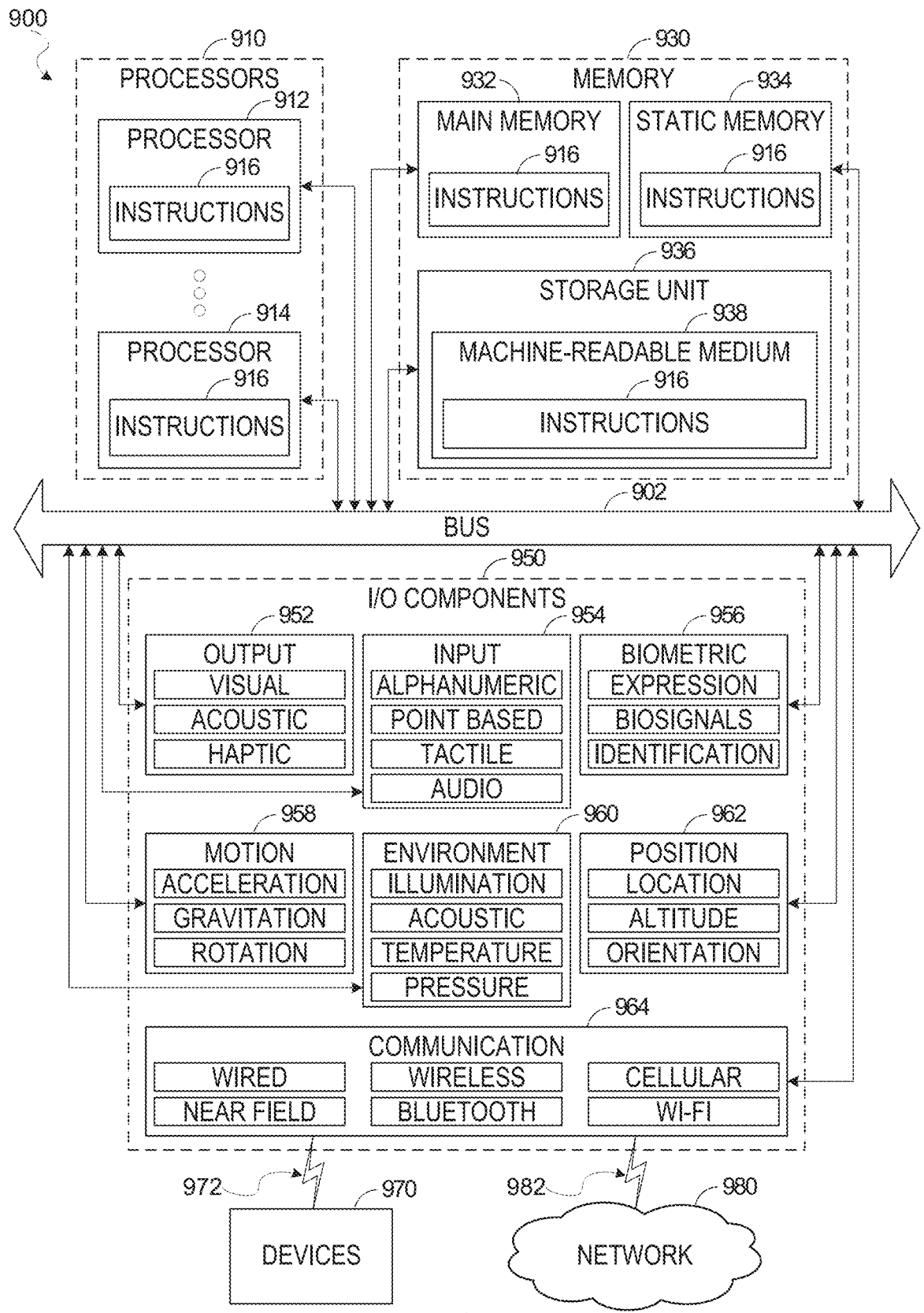
FIG. 9 is a block diagram illustrating components of a machine, in accordance with some aspects and embodiments of the invention, able to read instructions from a machine-readable medium (e.g., a machine-readable storage medium) and perform any one or more of the methodologies discussed herein.

Referring to FIG. 9, a block diagram illustrating components of a machine 900 is shown in accordance with some aspects and embodiments of the invention, The machine 900 is able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. As such, the instructions 916 may be used to implement modules or components described herein. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment.

The machine 900 may include, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines that individually or jointly execute the instructions 916 to perform any one or more of the methodologies discussed herein.

The machine 900 may include processors 910, memory/storage 930, and I/O components 950, which may be configured to communicate with each other such as via a bus 902. The memory/storage 930 may include a main memory 932, static memory 934, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936 (e.g., on machine readable-medium 938), within at least one of the processors 910 (e.g., within the processor cache memory accessible to processors 914 or 914), or any suitable combination thereof, during execution thereof by the machine 900. Accordingly, the memory 932, the storage unit 936, and the memory of the processors 910 are examples of machine-readable media.

The I/O components 950 may include a wide variety of components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environment components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environment components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or other suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

In accordance with the various aspects and embodiments of the invention, the term "carrier signal" in this context refers to any intangible medium that is capable of storing, encoding, or carrying instructions 916 for execution by the machine 900, and includes digital or analog communications signals or other intangible media to facilitate communication of such instructions 916. Instructions 916 may be transmitted or received over the network 980 using a transmission medium via a network interface device and using any one of a number of well-known transfer protocols.

In accordance with the various aspects and embodiments of the invention, the term "client device" in this context refers to any machine 900 that interfaces to a network 980 to obtain resources from one or more server systems or other client devices. The hardware appliance can include a computing system (e.g., a computer system integrated in vehicle 110) and can be implemented as, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 980.

In accordance with various aspects and embodiments of the invention, the machine account can be part of a vehicle wallet, wherein funds (or access to funds) are stored with the machine. In accordance with various aspects and embodiments of the invention, several payments can be made from the machine account for the machine (e.g., the car) and loaning of the machine or an operator. For example, the machine's loan can come with several (e.g., 6) months of tolls for payment of toll costs, etc. In accordance with various aspects and embodiments of the invention, using payment processing features that are on-board the machine, payments are processed locally (or at the machine) and the machine sends reports or key points (related to the processed or completed event) to bank, merchants, or any location defined to receive the information.

In accordance with various aspects and embodiments of the invention, using the machine account allows for the machine account to be used for payments where the machine (vehicle) pays for services, where a funding source (loan or line of credit) is linked to the machine account to allow purchases by the machine to be added to the balance of the funding source, where funds can be taken from the machine account of the machine to send payments related to loans or financial debt for the machine, and where the machine has a machine wallet for receiving and storing funds.

In accordance with the various aspects and embodiments of the invention, the term "communications network" in this context refers to one or more portions of a network 980 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 980 may include a wireless or cellular network and the coupling 982 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

In accordance with the various aspects and embodiments of the invention, the term "machine-readable medium" in this context refers to a component, a device, or other tangible media able to store instructions 916 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions 916 (e.g., code) for execution by a machine 900, such that the instructions 916, when executed by one or more processors 910 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

In accordance with the various aspects and embodiments of the invention, the term "component" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

In accordance with the various aspects and embodiments of the invention, the term "hardware component" is a tangible unit capable of performing certain steps and may be configured or arranged in a certain physical manner. In various example embodiments, one or more computer systems (e.g., a standalone computer system, a client computer system, or a server computer system) or one or more hardware components of a computer system (e.g., a processor 914 or a group of processors 910) may be configured by software (e.g., an application or application portion) as a hardware component that operates to perform certain steps as described herein. A hardware component may also be implemented mechanically, electronically, or any suitable combination thereof. For example, a hardware component may include dedicated circuitry or logic that is permanently configured to perform certain steps. A hardware component may be a special-purpose processor, such as a field-programmable gate array (FPGA) or an application-specific integrated circuit (ASIC). A hardware component may also include programmable logic or circuitry that is temporarily configured by software to perform certain steps. For example, a hardware component may include software executed by a general-purpose processor or other programmable processor. Once configured by such software, hardware components become specific machines (or specific components of a machine 900) uniquely tailored to perform the configured functions and are no longer general-purpose processors 910.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain steps described herein.

Considering embodiments in which hardware components are temporarily configured (e.g., programmed), each of the hardware components need not be configured or instantiated at any one instance in time. For example, where a hardware component includes a general-purpose processor 914 configured by software to become a special-purpose processor, the general-purpose processor 914 may be configured as respectively different special-purpose processors (e.g., including different hardware components) at different times. Software accordingly configures a particular processor 914 or processors 910, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform a step and store the output of that step in a memory device to which it is communicatively coupled. A further hardware component may then, at a later time, access the memory device to retrieve and process the stored output. Hardware components may also initiate communications with input or output devices, and can operate on a resource (e.g., a collection of information).

The various steps of example methods described herein may be performed, at least partially, by one or more processors 910 that are temporarily configured (e.g., by software) or permanently configured to perform the relevant steps. Whether temporarily or permanently configured, such processors 910 may constitute processor-implemented components that operate to perform one or more steps or functions described herein. As used herein, "processor-implemented component" refers to a hardware component implemented using one or more processors 910. Similarly, the methods described herein may be at least partially processor-implemented, with a particular processor 914 or processors 910 being an example of hardware. For example, at least some of the steps of a method may be performed by one or more processors 910 or processor-implemented components. Moreover, the one or more processors 910 may also operate to support performance of the relevant steps in a "cloud computing" environment or as a "software as a service" (SaaS). For example, at least some of the steps may be performed by a group of computers (as examples of machines 900 including processors 910), with these steps being accessible via a network 980 (e.g., the Internet) and via one or more appropriate interfaces (e.g., an API). The performance of certain of the steps may be distributed among the processors 910, not only residing within a single machine 900, but deployed across a number of machines 900. In accordance with some aspects and embodiments of the invention, the processors 910 or processor-implemented components may be located in a single geographic location (e.g., within a home environment, an office environment, or a server farm). In other example embodiments, the processors 910 or processor-implemented components may be distributed across a number of geographic locations.

In accordance with the various aspects and embodiments of the invention, the term "processor" in this context refers to any circuit or virtual circuit (a physical circuit emulated by logic executing on an actual processor 914) that manipulates data values according to control signals (e.g., "commands," "op codes," "machine code," etc.) and which produces corresponding output signals that are applied to operate a machine 900. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 910 may further be a multi-core processor 910 having two or more independent processors 912, 914 (sometimes referred to as "cores") that may execute instructions 916 contemporaneously.

In view of the disclosure above, various examples are set forth below. It should be noted that one or more features of an example, taken in isolation or combination, should be considered within the disclosure of this application.

In addition to the various embodiments described herein, it is to be understood that other similar embodiments can be used or modifications. Furthermore, additions can be made to the described implementation(s) for performing the same or equivalent function of the corresponding implementation(s) without deviating therefrom.

Practitioners skilled in the art will recognize many possible modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link. For example, a communication link may be established using a wired connection, wireless protocols, near-field protocols, near field communication or RFID.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Accordingly, the scope of the invention, therefore, is not intended to be limited to the embodiments shown and described herein. Rather, the scope and spirit of present invention is embodied by the appended claims.

What is claimed is:

1. A method, which is implemented in code that is store in a memory accessible by a processor and executed by a processor, the method comprising:
   generating a credential that uniquely identifies a machine, wherein the credential is derived from data that is unique to the machine;
   activating a machine account using the credential, wherein the machine uses the machine account to complete transactions;
   receiving seed identification data from the machine, wherein the seed identification data includes at least one sensor that provides an original sensor reading and wherein the seed identification data and the credential are used to build a profile for the machine and the machine uses the profile as a trust mechanism to interact with other devices, wherein the profile defines a scope of allowable transactions resulting in a transaction profile that controls use of the machine account;
   updating the profile using new identification data received from the machine to generate an update profile, wherein the new identification data is a current sensor reading that has changed since the original sensor reading relative to the seed identification data resulting in a unique profile every time the profile is updated;
   using an updated profile with a transaction request to analyze the transaction request to determine authenticity of the transaction request, wherein purchase activity associated with the transaction request is streamlined using the updated profile and wherein a next transaction request is analyzed based on at least one of: information collected from the machine, prior transaction history, needed action for the machine, parameters set by an owner of the machine, and data derived from one or more thereof; and
   allowing the transaction request when the transaction request is authentic and allowable.

2. The method of claim 1, wherein the machine is a vehicle and wherein the new identification data is collected from any sensor of the vehicle, which sensor may provide data of a type that includes at least one of: odometer reading, speed/direction information, current location information, sensor reading information from an onboard computer, time-stamped information, detected near-by device information, device connectivity information, and historical vehicle service information form past services.

3. The method of claim 1 further comprising:
   training a model using the updated profile; and
   using the trained model for authentication of any request originating from the machine.

4. The method of claim 3 further comprising:
   predicting a future transaction based on at least one of: information collected from the machine, prior transaction history, needed action for the machine, parameters set by the machine's owner, and data derived from one or more thereof;
   comparing an incoming transaction request from the machine to the future transaction; and
   determining allowability and authenticity of the incoming transaction request.

5. The method of claim 1 further comprising:
   receiving a transaction request to initiate a transaction that will be settled using the machine account;
   confirming that the transaction request is associated with the machine based on analysis of the profile; and
   approving a transaction identified in the transaction request when the transaction is of an approved transaction type.

6. The method of claim 5 further comprising:
   updating the profile using historical information received from the machine; and
   using the historical information to train a machine learning model.

7. The method of claim 1, further comprising transmitting a positive authentication value to approve a transaction request based on a current value of a vehicle state value satisfying a preconfigured threshold.

8. A system comprising:
   memory for storing code; and
   at least one processor in communication with the memory, wherein the processor executes the code and causes the system to:
      generate a credential that uniquely identifies a machine, wherein the credential is derived from data that is unique to the machine;
      activate a machine account using the credential, wherein the machine uses the machine account to complete transactions;
      receive seed identification data from the machine, wherein the seed identification data includes an initial sensor reading at least one sensor of the machine;
      create, from the seed identification data and the credential, a profile for the machine, wherein a hash function is used to generate the profile and the profile acts as a continuous machine identifier to interact with other devices and the profile includes a scope of allowable transactions resulting in a transaction profile that controls use of the machine account;
      receive new identification data from the machine, wherein the new identification data includes a current sensor reading that is different from the initial sensor reading, which was used to create the profile, and changes relative to the seed identification data to allow for continuous profile updates, such that the profile changes with every update;
      update the profile using the new identification data to generate an updated profile;
      analyze a transaction request with the updated profile, wherein a purchase activity is associated with the transaction request and the purchase activity is streamlined by eliminating initiation of the purchase activity from a merchant, in light of the transaction profile to determine authenticity and allowability of the transaction request;
      allowing the transaction request when the transaction request is authentic and allowable; and
      analyzing a nest transaction request based on at least one of: information collected from the machine, prior transaction history, needed action for the machine, parameters set by an owner of the machine, and data derived from one or more thereof.

* * * * *